US012598101B2

(12) United States Patent
Motipalli et al.

(10) Patent No.: US 12,598,101 B2
(45) Date of Patent: Apr. 7, 2026

(54) CREST FACTOR REDUCTION CANCELLATION PULSE HAVING A REDUCED LENGTH

(71) Applicant: Intel Corporation, Santa Clara, CA (US)

(72) Inventors: Sunitha Motipalli, Pompano Beach, FL (US); Kameran Azadet, San Ramon, CA (US); Albert Molina, Novelda A (ES); Joseph Othmer, Ocean, NJ (US); Kannan Rajamani, Basking Ridge, NJ (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 17/854,155

(22) Filed: Jun. 30, 2022

(65) Prior Publication Data

US 2024/0007337 A1 Jan. 4, 2024

(51) Int. Cl.
*H04L 27/26* (2006.01)
*H04B 1/04* (2006.01)

(52) U.S. Cl.
CPC ...... *H04L 27/2618* (2013.01); *H04L 27/2615* (2013.01); *H04L 27/262* (2013.01); *H04B 1/0475* (2013.01)

(58) Field of Classification Search
CPC ............. H04L 27/2618; H04L 27/2615; H04L 27/262; H04L 27/2624; H04B 1/0475
USPC ................................. 375/250, 260, 295–297
See application file for complete search history.

(56) References Cited

U.S. PATENT DOCUMENTS

| | | | | |
|---|---|---|---|---|
| 9,160,594 B1* | 10/2015 | Copeland | ............ | H04L 27/2624 |
| 9,485,129 B1* | 11/2016 | Cope | ................ | H04L 27/2623 |
| 10,411,656 B1* | 9/2019 | Dick | ...................... | H04N 7/102 |
| 11,538,137 B2* | 12/2022 | Courtney | ........... | G01R 33/5608 |
| 11,770,284 B1* | 9/2023 | Janani | ..................... | H04L 27/00 |
| | | | | 375/295 |
| 2011/0270590 A1* | 11/2011 | Aparin | .................. | H03F 1/3258 |
| | | | | 703/2 |
| 2012/0093210 A1* | 4/2012 | Schmidt | ............. | H04L 27/2624 |
| | | | | 375/224 |
| 2012/0290633 A1* | 11/2012 | McGowan | ......... | H03H 17/0294 |
| | | | | 708/322 |
| 2014/0044215 A1* | 2/2014 | Mundarath | ......... | H04L 27/2624 |
| | | | | 375/297 |
| 2016/0028574 A1* | 1/2016 | Wang | .................... | H04L 27/367 |
| | | | | 375/296 |
| 2019/0356525 A1* | 11/2019 | Wen | .................... | H04L 27/2624 |

(Continued)

*Primary Examiner* — Emmanuel Bayard
(74) *Attorney, Agent, or Firm* — Banner & Witcoff, Ltd.

(57) ABSTRACT

Techniques are disclosed for the use of Crest Factor Reduction (CFR) technique that utilizes a cancellation pulse signal having a reduced length. The CFR technique may be applied to a signal to be transmitted, which may comprise a composite signal having one or more carrier signals. Each carrier signal of the composite signal may be filtered via a respective channel filter and then recombined to form the signal to be transmitted, on which the CFR operations are then applied. The length of the cancellation pulse signal is less than the number of taps of the channel filter with the largest number of taps. This reduction in cancellation pulse signal length significantly reduces the processing power required to perform the CFR operations while maintaining regulatory emissions compliance.

21 Claims, 25 Drawing Sheets

650

(56)             References Cited

U.S. PATENT DOCUMENTS

2024/0053432 A1 *   2/2024   Arslan  ................... G01S 7/006
2024/0163153 A1 *   5/2024   Janani  ................ H04L 27/2621

* cited by examiner

100

600

720

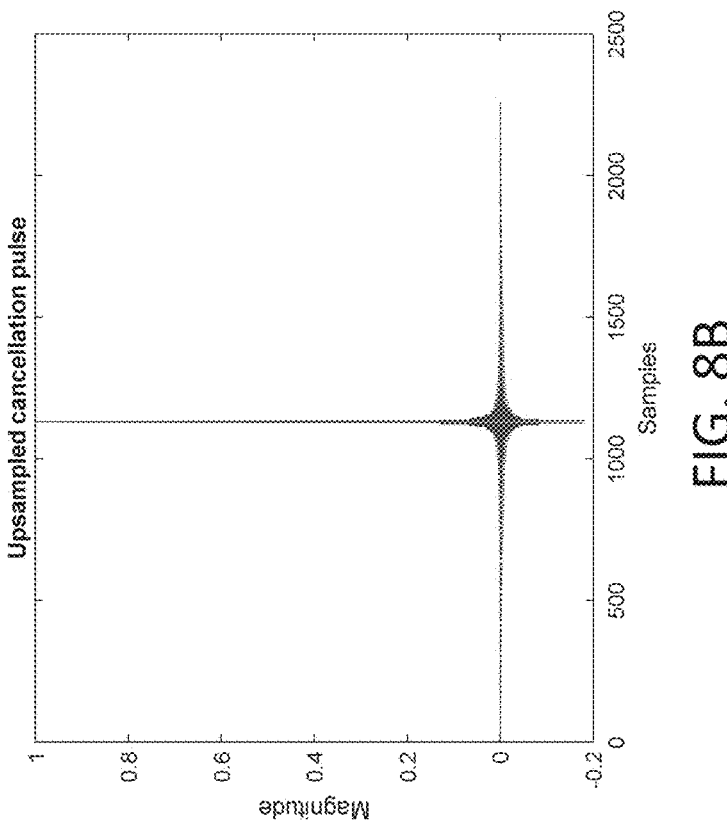
850
FIG. 8B
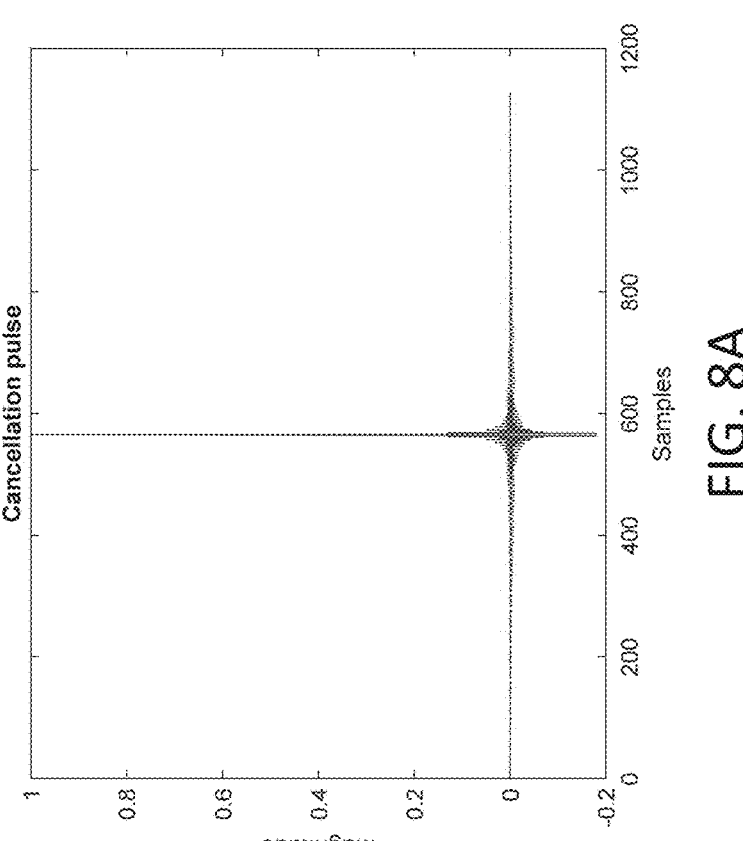
800
FIG. 8A g' = 60
Delta = 30

840

870

860

PSD for [5xNR50M, contiguous]

1002 —— signal before CFR
1004 —— signal after proposed
          CFR - cancellation at
          lower sampling rate
1006 —— mask Frequency (MHz)

PSD (dBm/Hz)

1000

PSD for [4xNR50M, contiguous]

1102 —— signal before CFR
1104 —— signal after proposed CFR - reduced cancellation pulse
1106 —— mask Frequency (MHz)

PSD (dBm/Hz)

1100

1200

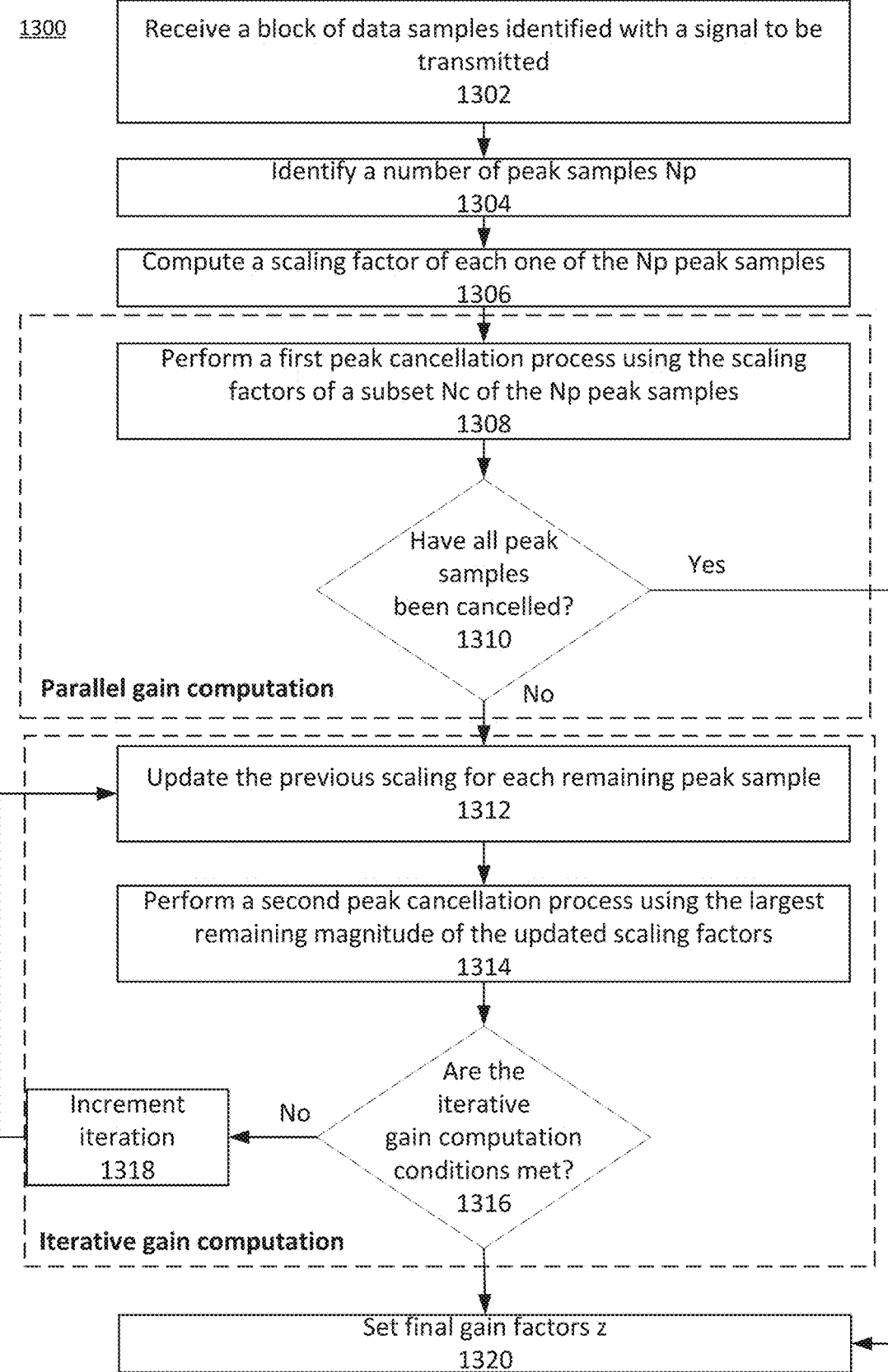

1300

Receive a block of data samples identified with a signal to be transmitted
1302

Identify a number of peak samples Np
1304

Compute a scaling factor of each one of the Np peak samples
1306

Perform a first peak cancellation process using the scaling factors of a subset Nc of the Np peak samples
1308

Have all peak samples been cancelled?
1310

Yes

No

Parallel gain computation

Update the previous scaling for each remaining peak sample
1312

Perform a second peak cancellation process using the largest remaining magnitude of the updated scaling factors
1314

Are the iterative gain computation conditions met?
1316

No

Increment iteration
1318

Iterative gain computation

Set final gain factors z
1320

Generate a reduced length scaled cancellation pulse signal comprising a set of data samples
1402

Perform CFR on a signal to be transmitted using the reduced length scaled cancellation pulse signal
1404

Transmit the signal after the CFR operations have been performed
1406

CREST FACTOR REDUCTION CANCELLATION PULSE HAVING A REDUCED LENGTH

TECHNICAL FIELD

The disclosure described herein generally relates to techniques for performing crest factor reduction (CFR) for the transmission of signals and, more particularly, to CFR techniques that utilize cancellation pulses having a reduced length.

BACKGROUND

For wireless data transmissions, the power amplifier (PA) operates efficiently when the transmit signal has a higher average power. Crest factor reduction (CFR) is a digital technique used to reduce the peak-to-average power ratio (PAPR) of the transmitted signal, which may contribute to the degradation of the signal quality. Furthermore, current CFR algorithms are complex and require significant processing power, and may also increase the error vector magnitude (EVM) of the transmitted signal.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

FIG. 8A illustrates a cancellation pulse, in accordance with the disclosure;

FIG. 8B illustrates an upsampled cancellation pulse, in accordance with the disclosure;

FIG. 13 illustrates a process flow, in accordance with the disclosure; and

The present disclosure will be described with reference to the accompanying drawings. The drawing in which an element first appears is typically indicated by the leftmost digit(s) in the corresponding reference number.

DETAILED DESCRIPTION

Figure 1:
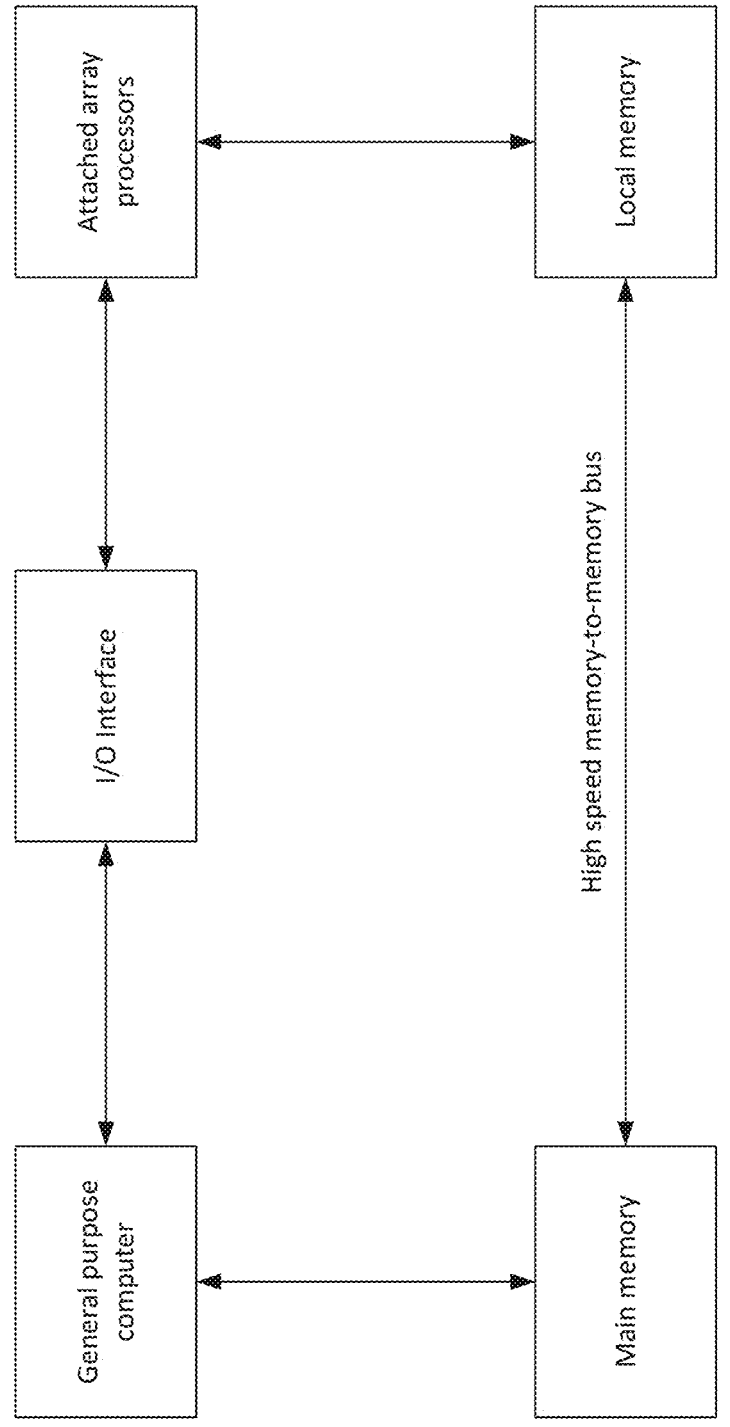
FIG. 1 illustrates an example of a conventional vector processor architecture.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Programmable Processing Array Operation

The programmable processing arrays as discussed in further detail herein may be implemented as vector processors or any other suitable type of array processors, of which vector processors are considered a specialized type. Such array processors may represent a central processing unit (CPU) that implements an instruction set containing instructions that operate on one-dimensional arrays of data referred to as data "vectors." This is in contrast to scalar processors having instructions that operate on single data items. Vector processors can greatly improve performance on certain workloads, notably numerical simulation and similar tasks, by utilizing a number of execution units, which are alternatively referred to herein as cores, execution units processing units, functional units, or processing elements (PEs), and which independently execute specific functions on incoming data streams to achieve a processing flow.

Generally speaking, conventional CPUs manipulate one or two pieces of data at a time. For instance, conventional CPUs may receive an instruction that essentially says "add A to B and put the result in C," with 'C' being an address in memory. Typically, the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will be repeatedly executed on another item of data, at an address one increment larger than the last. This allows for significant savings in decoding time.

Figure 2:
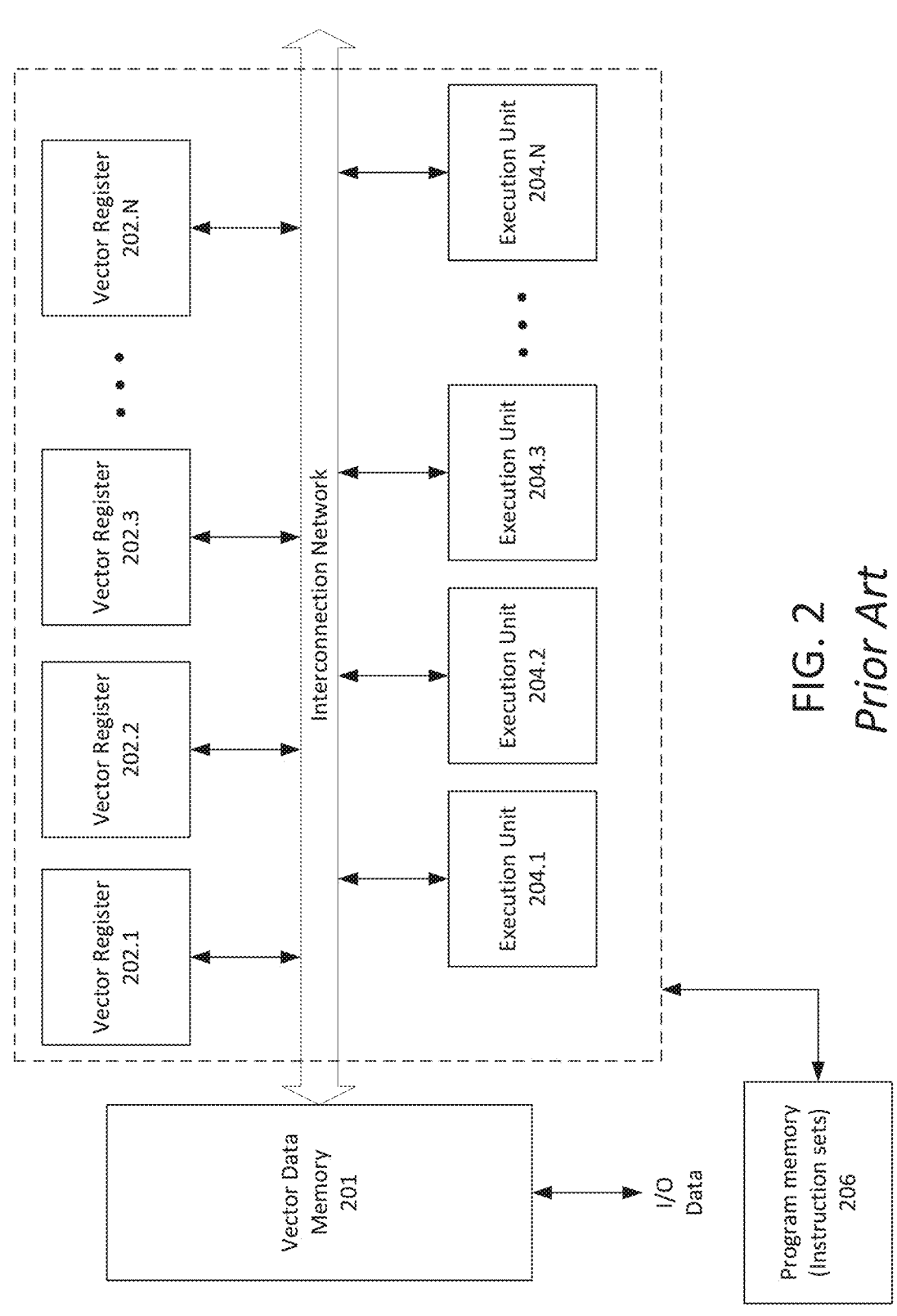
FIG. 2 illustrates another example of a conventional vector processor architecture.

Vector processors may be implemented in accordance with various architectures, and the various programmable array processor architectures as discussed throughout the disclosure as further described herein may be implemented in accordance with any of these architectures or combinations of these architectures, as well as alternative processing array architectures that are different than vector processors. FIGS. 1 and 2 provide two different implementations of a vector processor architecture. FIG. 1 illustrates an attached vector processor, which is attached to a general purpose computer for the purpose of enhancing and improving the performance of that computer in numerical computational tasks. The attached vector processor achieves high performance by means of parallel processing with multiple functional units.

FIG. 2, on the other hand, shows an example of a single instruction stream, multiple data streams (SIMD) vector processor architecture. The vector processor architecture 200 as shown in FIG. 2 may have an architecture consisting of one or more execution units. Each execution unit is capable of executing one instruction. Each instruction can be a control, load/store, scalar, or a vector instruction. Therefore, a processor architecture with N execution units 204.1-204.N as shown in FIG. 2 can issue as many as N instructions every clock cycle. The execution units 204.1-204.N function under the control of a common control unit (such as processing circuitry), thus providing a single instruction stream to control each of the execution units 204.1-204.N. The I/O data as shown in FIG. 2 is typically identified with data communicated between the vector processor 200 and another data source or processor (which may be the common control unit or another processor), depending upon the particular application. The vector data memory 201 thus stores data received as input to be processed by the execution units 204.1-204.N, and data that is output or read from the vector data memory 201 after the data is processed. The vector processor architecture 200 as shown in FIG. 2 is an example of a load-store architecture used by vector processors, which is an instruction set architecture that divides instructions into two categories: memory access (loading and storing data between the vector data memory 201 and the vector registers 202.1-202.N) and the vector processing operations performed by the execution units 204.1-204.N using the data retrieved from and the results stored to the vector registers 202.1-202.N.

Thus, the load-store instruction architecture facilitates data stored in the vector data memory 201 that is to be processed to be loaded into the vector registers 202.1-202.N using load operations, transferred to the execution units 204.1-204.N, processed, written back to the vector registers 202.1-202.N, and then written back to the vector data memory 201 using store operations. The location (address) of the data and the type of processing operation to be performed by each execution unit 204.1-204.N is part of an instruction stored as part of the instruction set in the program memory 206. The movement of data between these various components may be scheduled in accordance with a decoder that accesses the instructions sets from the program memory, which is not shown in further detail in FIG. 2 for purposes of brevity. The interconnection network, which supports the transfer of data amongst the various components of the vector processor architecture 200 as shown in FIG. 2, is generally implemented as a collection of data buses and may be shared among a set of different components, ports, etc. In this way, several execution units 204.1-204.N may write to a single vector register 202, and the data loaded into several vector registers 202.1-202.N may be read by and processed by several of the execution units 204.1-204.N. The use of instruction sets in accordance with the vector processor architecture 200 is generally known, and therefore an additional description of this operation is not provided for purposes of brevity.

Figure 3:
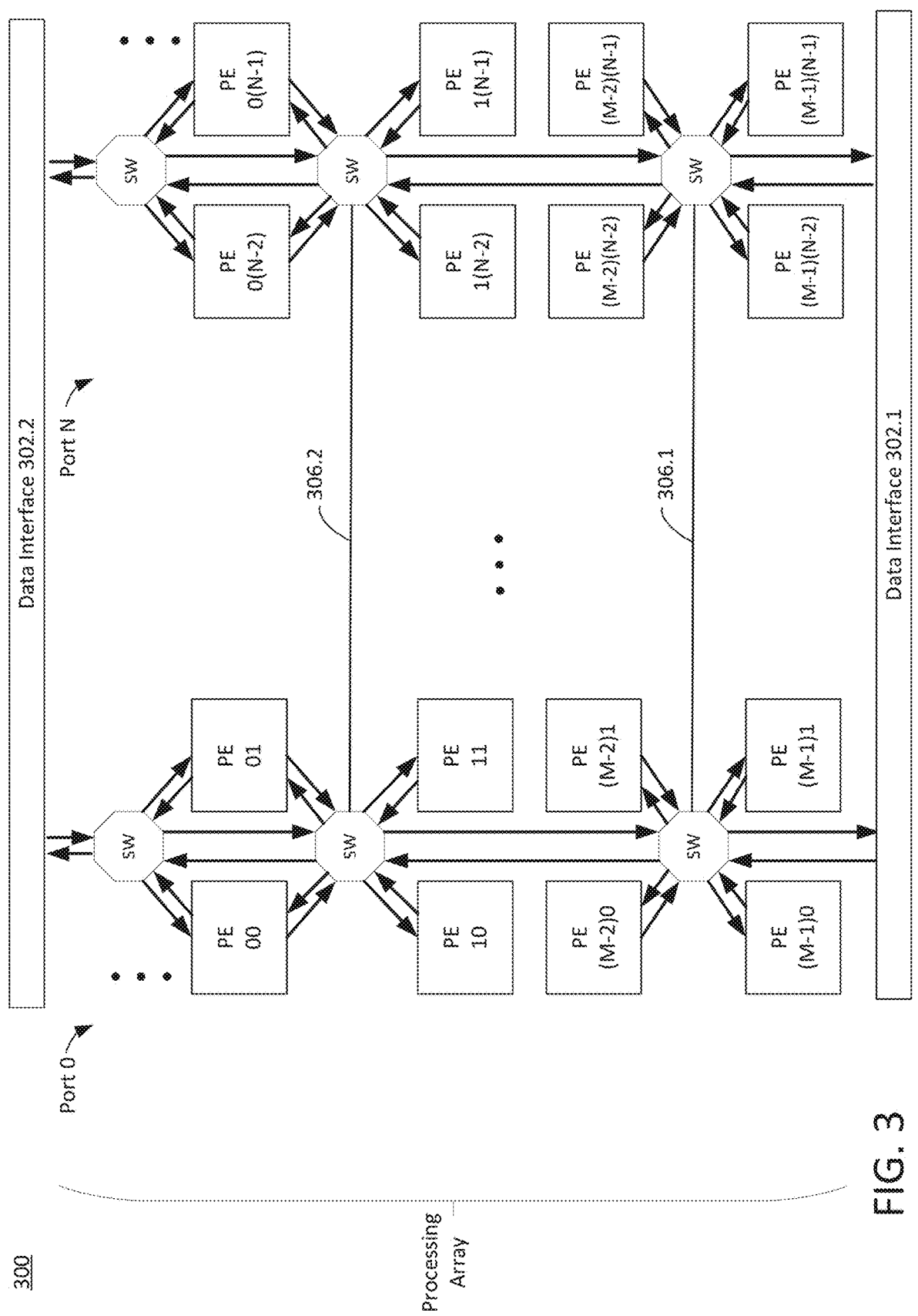
FIG. 3 illustrates a block diagram showing details of a portion of a programmable processing array, in accordance with the disclosure.

FIG. 3 illustrates a block diagram showing details of a portion of a programmable processing array, in accordance with the disclosure. The programmable processing array portion 300 as shown in FIG. 3 may also be referred to herein simply as a processing array, and may form part of a hybrid architecture that implements dedicated hardware blocks or as a standalone processing component. In any event, the processing array may include any suitable number N of ports, with each port including any suitable number M of processing elements (PEs). Although each port is shown in FIG. 3 as including 8 PEs, this is for ease of explanation and brevity, and the processing array may include any suitable number of such PEs per port. Thus, the processing array may include a mesh of PEs, the number of which being equal to the number of PEs per port (M) multiplied by the total number of ports (N). Thus, for an illustrative scenario in which the processing array includes 8 ports and 8 PEs per port, the processing array 408 would implement (M×N)= (8×8)=64 PEs. Moreover, in accordance with such a configuration, each port may be identified with a respective antenna that is used as part of a multiple-input multiple-output (MIMO) communication system. Thus, the number of antennas used in accordance with such systems may be equal to the number N of ports, with each port being dedicated to a data stream transmitted and received per antenna.

Each of the PEs in each port of the processing array may be coupled to the data interfaces 302.1, 302.2, and each PE may perform processing operations on an array of data samples retrieved via the data interfaces 302.1, 302.2. The access to the array of data samples included in the PEs may be facilitated by any suitable configuration of switches (SW), as denoted in FIG. 3 via the SW blocks. The switches within each of the ports of the processing array may also be coupled to one another via interconnections 306.1, 306.2, with two being shown in FIG. 3 for the illustrative scenario of each port including 8 PEs. Thus, the interconnections 306.1, 306.2, function to arbitrate the operation and corresponding data flow of each grouping of 4 PEs within each port that are respectively coupled to each local port switch. The flow of data to a particular grouping of PEs and a selection of a particular port may be performed in accordance with any suitable techniques, including known techniques. In one illustrative scenario, this may be controlled by referencing the global system clock or other suitable clock via an SoC, network, system, etc., of which the processing array forms a part.

Thus, at any particular time, one or more of the PEs may be provided with and/or access an array of data samples provided on one of the data buses to perform processing operations, with the results then being provided (i.e. transmitted) onto another respective data bus. In other words, any number and combination of the PEs per port may sequentially or concurrently perform processing operations to provide an array of processed (i.e. output) data samples to another PE or to the data interfaces 302.1, 302.2 via any suitable data bus. The decisions regarding which PEs perform the processing operations may be controlled via operation of the switches, which may include the use of control signals in accordance with any suitable techniques to do so, including known techniques.

However, and as further discussed below, the data interfaces 302.1, 302.2 function as "fabric interfaces" to couple the processing array to other components of the architecture in which the processing array is implemented. Thus, the data interfaces 502.1, 502.2 are configured to facilitate the exchange of data between the PEs of the processing array, one or more hardware components such as hardware accelerators, an RF front end, and/or a data source. The data interfaces 302.1, 302.2 may thus to be configured to provide data to the processing array that is to be transmitted. The data interfaces 302.1, 302.2 are configured to convert received data samples to arrays of data samples upon which the processing operations are then performed via the PEs of the processing array. The data interfaces 302.1, 302.2 are also configured to reverse this process, i.e. to convert the arrays of data samples back to a block or stream of data samples, as the case may be, which are then provided to one or more hardware components such as hardware accelerators, an RF front end, and/or a data source, etc.

The data interfaces 302.1, 302.2 may represent any suitable number and/or type of data interface that is configured to transfer data samples between any suitable data source and other components of the device in which the processing array is implemented. Thus, the data interfaces 302.1, 302.2 may be implemented as any suitable type of data interface for this purpose, such as a standardized serial interface used by data converters (ADCs and DACs) and logic devices (FPGAs or ASICs), and which may include a JESD-based standard interface and/or a chip-to-chip (C2C) interface. The data samples provided by the data source as shown in FIG. 3 may be in a data array format or provided as streaming (i.e. serial) data bit streams. In the latter case, the data interfaces 302.1, 302.2 may implement any suitable type and/or number of hardware and/or software components, digital logic, etc., to manage the translation of the streams of data bit samples to an array of data samples recognized and implemented via the processing array, and vice-versa.

In one scenario in which the processing array is implemented as part of a wireless communication device, each of the PEs in the processing array may be coupled to the data interfaces 302.1, 302.2 via any suitable number and/or type of data interconnections, which may include wired buses, ports, etc. The data interfaces 302.1, 302.2 may thus be implemented as a collection of data buses that couple each port (which may represent an individual channel or grouping of individual PEs in the processing array) to a data source via a dedicated data bus. Although not shown in detail in the Figures, in accordance with such scenarios each data bus may be adapted for use in a digital front end (DFE) used for wireless communications, and thus the dedicated buses may include a TX and an RX data bus per port in this non-limiting scenario.

General Implementation of Crest Factor Reduction

Again, for wireless data transmissions, the power amplifier (PA) operates efficiently when the transmit signal has a higher average power. As an illustrative scenario, the transmit signal of a base station has a high peak power to average power ratio (PAPR) due to the use of multiple access modulation schemes. But by lowering the PAPR of the transmit signal, it is possible to transmit at a higher average power to maintain better efficiency of the PA. CFR techniques are aimed at achieving this goal.

Traditionally, the simplest CFR technique for PAPR reduction is magnitude clipping. Such techniques involve hard clipping of the signal samples whose magnitude exceed a predetermined clipping level to "truncate" the samples to the predetermined clipping level while maintaining the sample phase. This method has a minimal effect on the error vector magnitude (EVM) and reduces large peaks, but also introduces distortion in the signal. Furthermore, the sharp corners of the clipped signal cause out-of-band emissions and reduce the adjacent channel leakage ratio (ACLR). Thus, such clipping techniques are typically only used as a last stage in conjunction with other CFR techniques to achieve a target PAPR.

Conventional CFR algorithms function to perform peak cancellation to facilitate CFR. This is typically accomplished by first using peak detection in which all the peaks of the signal that are above a predetermined threshold are detected. Then, the identified peaks are cancelled by subtracting a scaled cancellation pulse from the signal to reduce its peak amplitude. However, the peak cancellation used in accordance with such conventional CFR algorithms may result in peak "regrowth," in which new peaks appear or "regrow" in the signal sample due to the noise induced in band via the cancellation pulse.

Figure 4:
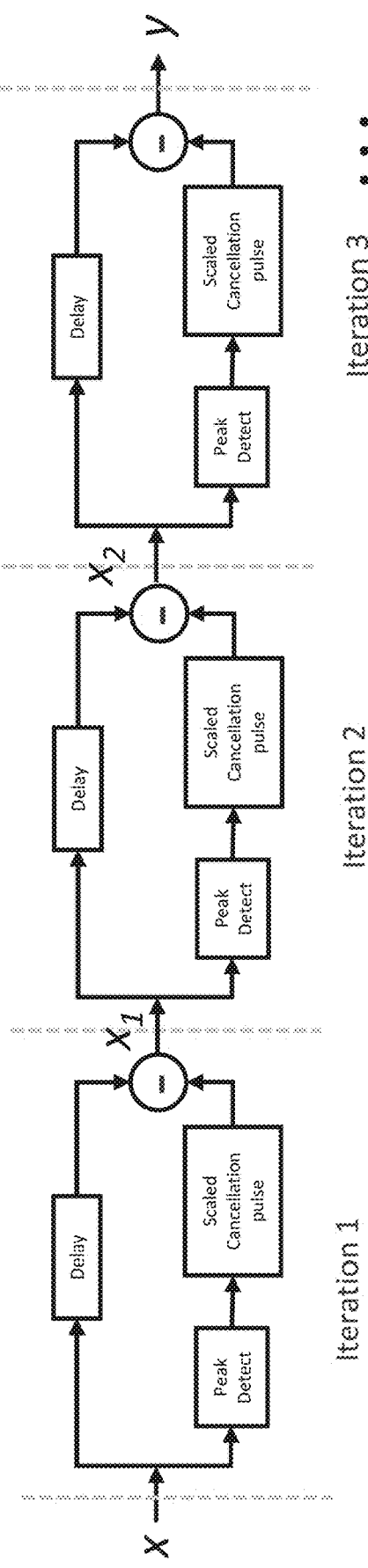
FIG. 4 illustrates a conventional Crest Factor Reduction algorithm.

Thus, these techniques generally require several iterations of peak detection and cancellation to achieve the target PAPR. For instance, and as shown in FIG. 4, an input signal x may comprise a set of data samples. Peak detection is then performed on the input signal to generate a scaled cancellation pulse, which is then subtracted from a delayed version of the input signal to generate an output signal x1 after a first iteration. However, due to peak regrowth the output signal x1 may still comprise samples having a magnitude that exceeds the predetermined threshold value, and thus this process is repeated in a second iteration to generate a second output signal x2, and third iteration is then performed to finally yield the output signal y that meets the PAPR goal. Thus, the execution of several iterations in this manner increases the complexity and processing power required to execute the CFR algorithm, and may also increase the signal EVM.

Further complicating this issue, the cancellation pulse typically comprises a number of samples, referred to herein as a length or a sample length. To perform the CFR algorithm, the scaled cancellation pulse is generated by multiplying each one of a set of gain factors, which may represent complex values, by each respective one of the samples in the cancellation pulse. Because the cancellation pulse is typically of a length equal to the number of taps identified with the channel filter used to filter the input signal x, a number of complex multiplications are required that is equal to the sample length of the cancellation pulse to generate the scaled cancellation pulse. Thus, the sample size of the cancellation pulse significantly contributes to the processing power and complexity required to perform the CFR algorithm.

As further discussed herein, the disclosure is directed to techniques for performing CFR operations that address these issues by reducing the sample length of the cancellation pulse to less than the number of taps in a corresponding channel filter. The cancellation pulse may thus substantially resemble the input signal for which peaks are to be cancelled as part of the CFR process, but is not identical to the input signal as is conventionally the case. Instead, the edges of the cancellation pulse signal may deviate from the edges of the input signal, thus the criterion for spectral mask requirements are still met.

CFR Implementation in a Transmit Chain

Figure 5:
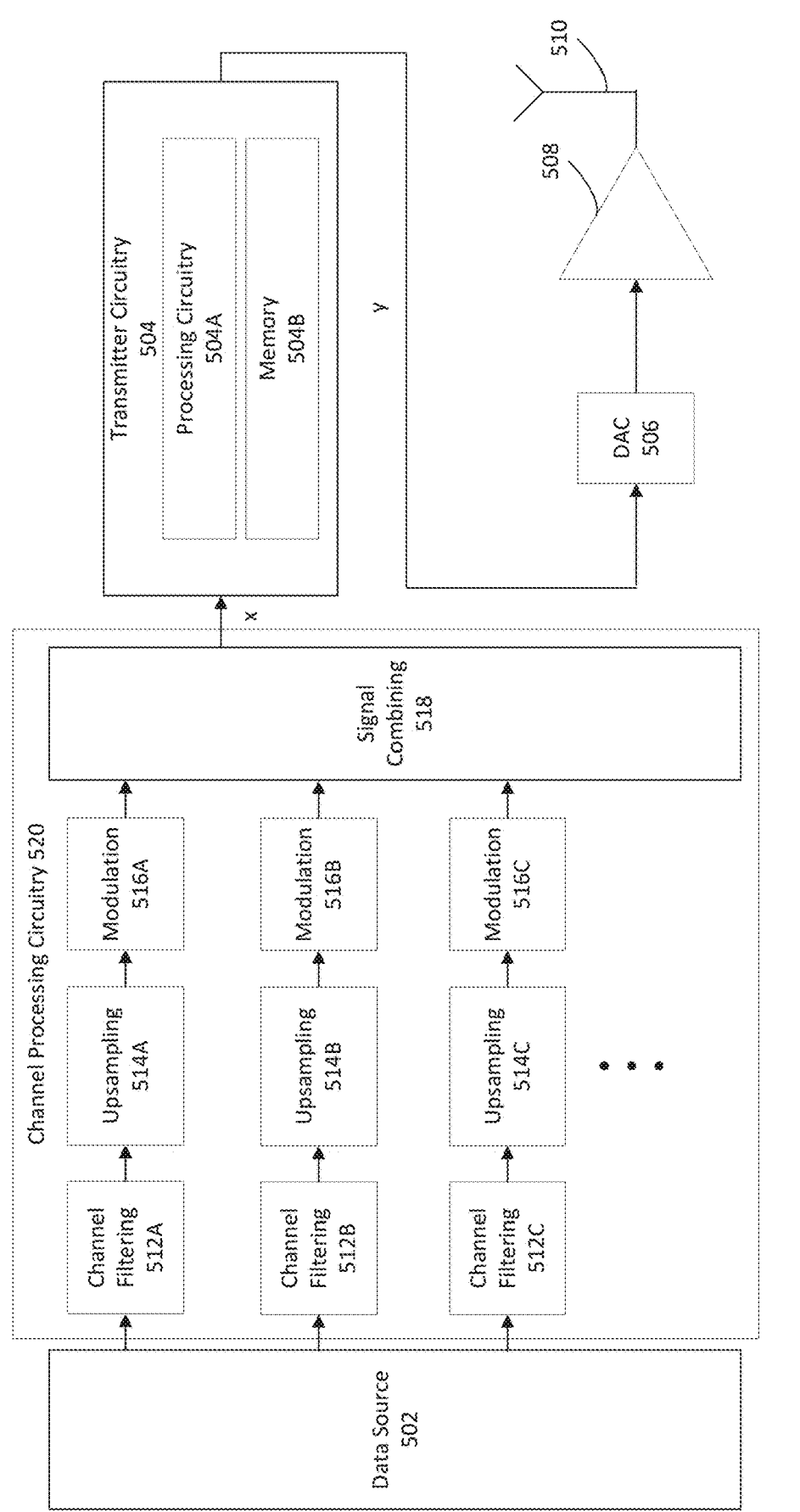
FIG. 5 illustrates a block diagram of a transmit chain, in accordance with the disclosure.

FIG. 5 illustrates a block diagram of a transmit chain, in accordance with the disclosure. The transmit chain 500 as shown in FIG. 5 may be identified with any suitable type of device that transmits and optionally receives wireless data. The transmit chain 500 may be part of a transceiver, with the portions of the receiver chain and accompanying elements being omitted for brevity and ease of explanation. In some illustrative and non-limiting scenarios, the transmit chain 500 may be identified with a base station or other suitable wireless device configured to transmit data in accordance with any suitable wireless communication protocol and/or data rates.

The transmit chain 500 or, alternatively, any portions of the transmit chain 500 as shown in FIG. 5 may be implemented as a system on a chip (SoC). In one illustrative and non-limiting scenario, the channel processing circuitry 520, transmitter circuitry 504, and/or the DAC 506 may be implemented on the SoC, with chip-to-chip connections or other suitable connections being made to couple these SoC components to the data source 502, the PA 508, etc. Of course, any of the components of the transmit chain 500, including additional, alternate, or fewer components that those shown in FIG. 5, may be implemented as part of such an SoC depending upon the particular application. Furthermore, any of the components of the transmit chain 500, including additional, alternate, or fewer components that those shown in FIG. 5, may be implemented as separate components, or combined or otherwise integrated as part of the same chip or components. Thus, the components as shown in FIG. 5 are provided for ease of explanation to map respective functions with the blocks shown, but is a non-limiting and illustrative scenario.

The transmit chain 500 as shown in FIG. 5 may receive data samples to be transmitted via the data source 502. The data source 502 may be implemented as any suitable type of data source to facilitate the transmission of data in accordance with any suitable data rate and/or communication protocol. The data source 502 may comprise a data modem or any other suitable components configured to provide data samples to be transmitted, which may include in-phase and quadrature-phase (IQ) data in a digital form. Thus, the data source 502 may provide channelized data streams depending upon the particular communication protocol that is implemented as well as the configuration of the signal to be transmitted in terms of bandwidth and a number of carrier signals.

The transmit chain 500 may include channel processing circuitry 520, which may alternatively be referred to herein as a channel processing block. The channel processing circuitry 520 may comprise any suitable number of channelized transmit paths, with three (i.e. A, B, and C) being shown in FIG. 5 in a non-limiting and illustrative scenario. Each of these channel transmit paths corresponds to a carrier signal that forms part of the input signal x that is to be transmitted after the various CFR operations have been performed, as further discussed herein. Each channel transmit path includes a channel filtering block 512, an upsampling block 514, and a modulation block 516.

Each of the channel filtering blocks 512 is configured to perform finite impulse response (FIR) filtering in accordance with any suitable number of taps, as discussed herein. Thus, each of the channel filtering blocks 512 has a frequency response that is based upon a predetermined frequency and bandwidth of the carrier signal corresponding to that respective channelized transmit path, such as 20 MHz, 50 MHz, 100 MHz, etc. The channel filtering blocks 512 may have a frequency response corresponding to any suitable type of filter response such as a bandpass, low-pass, etc. Each of the channel filtering blocks 512A, 512B, 512C, etc. within each respective channelized transmit path may operate independently in accordance with various filter parameters such as a number of taps, bandwidth, frequency response, etc., which may be different than one another or identical to one another depending upon the particular implementation and the channel configurations. In one non-limiting and illustrative scenario, the channel filtering blocks 512A may be implemented as low-pass filters, bandpass filters, etc., having a bandwidth and band stop frequencies identified with their respective channels.

Moreover, each channelized transmit path also includes an upsampling block 514 configured to upsample the filtered carrier signal at any suitable sampling rate, which may also be based upon the predetermined frequency and bandwidth of the carrier signal corresponding to that respective channelized transmit path, and which may be a function of the particular communication protocol that is implemented. Each channelized transmit path also includes a modulation block 516 configured to perform data modulation in accordance with any suitable modulation scheme on the filtered and upsampled carrier signals, which may also be a function of the particular communication protocol that is implemented.

The channel processing circuitry 520 further comprises a signal combining block 518, which is configured to combine each of the channelized carrier signals that have been filtered, upsampled, and modulated into a single composite signal having a bandwidth that contains each of the carrier signals. This composite signal may be identified with the input data signal x as discussed herein, which may comprise any suitable number of carrier signals each having a respective bandwidth based upon the communication protocol and channel configuration of a signal to be transmitted. As the channel processing circuitry 520 and the transmitter circuitry 504 operate in the digital domain, the input signal x may be part of a digital data stream of IQ samples and/or blocks of IQ data samples, as discussed herein. That is, the input data signal x may represent any suitable number of data samples identified with a data transmission, which may be identified with any suitable number of carrier signals.

The transmit chain 500 further comprises transmitter circuitry 504, which may be implemented as any suitable number and/or type of components configured to facilitate the generation of the output signal y, which may alternatively be referred to herein as a transmit signal. The transmit signal is thus identified with the signal to be transmitted after the input signal x is subjected to the CFR operations as discussed herein to cancel magnitude peaks in the data samples identified with the input data signal x.

The transmitter circuitry 504 may additionally or alternatively comprise other elements not shown in FIG. 5 for purposes of brevity. That is, the transmitter circuitry 504 may comprise an RF front end and/or any suitable type of components associated with known transmitter operation, configurations, and implementations. The transmitter circuitry 504 may thus include components typically identified with an RF front end such as additional filters, mixers, local oscillators (LOs), upconverters, downconverters, channel tuners, one or more data interfaces, etc. The data received via the transmitter circuitry 504 (such as received data samples identified with the input signal x), data output by the transmitter circuitry 504 for transmission (such as data samples identified with the output signal y) may be processed as sets of data samples via the transmitter circuitry 504, as discussed herein.

Therefore, although the input signal x is shown in FIG. 5 and discussed herein as being directly received by the transmitter circuitry and the CFR operations are performed with respect to the input signal x, the transmitter circuitry may additionally perform other operations on the input signal x prior to the CFR operations as discussed herein and/or additional operations after the output signal y is generated. This may include additional filtering, upconversion, etc.

The transmitter circuitry 504 comprises processing circuitry 504A, which may be configured as any suitable number and/or type of processing circuitry and/or computer processors. The processing circuitry 504A may be identified with one or more processors (or suitable portions thereof) implemented by the device or a host system that implements the transmitter circuitry 504. Additionally or alternatively, the processing circuitry 504A may be identified with processing circuitry dedicated to or otherwise identified with the transmit chain 500.

The processing circuitry 504A is configured to execute the various CFR operations as further discussed herein. That is, for software implementations (or portions thereof) at least a portion of the processing circuitry 504A may be identified with the processing array as discussed above with reference to FIG. 3, and thus the CFR operations as discussed herein may be executed via such a processing array architecture. Software implementations (or portions thereof) may also include the processing circuitry 504A being implemented as one or more processors, which execute machine-readable instructions stored in the memory 504B to perform the CFR operations as discussed herein. Additionally or alternatively, the processing circuitry 504A may implement hardware implementations via one or more microprocessors, microcontrollers, an application-specific integrated circuit (ASIC), part (or the entirety of) a field-programmable gate array (FPGA), etc. Combinations of the software and hardware implementations may also be utilized. Thus, although the CFR operations are described herein may be described as part of the functionality of a CFR "algorithm," the CFR operations may be performed as software-based, hardware-based, or combinations of software and hardware-based implementations.

The transmitter circuitry 504 comprises memory 504B, which may be configured to store data and/or instructions such that, when the instructions are executed by the processing circuitry 504A, cause the processing circuitry 504A to perform various CFR operations as described herein. The memory 504B may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 504B may be non-removable, removable, or a combination of both. The memory 504B may be implemented as a non-transitory computer readable medium storing one or more executable instructions such as, for example, logic, algorithms, code, etc. In any event, the instructions, logic, code, etc., stored in the memory 504B may enable the functionality disclosed herein identified with the execution of the CFR operations to be functionally realized.

Once the transmitter circuitry generates the output data signal y, which may be represented a as a set of data samples, these data samples are then provided to the DAC 506 as shown in FIG. 5. These data samples are then converted to their analog-value equivalents, provided to the power amplifier 508, and then transmitted via the antenna 510. Because the data samples representing the output data signal y are CFR-corrected, i.e. the peaks exceeding the predetermined threshold are removed (or at least significantly reduced), efficiency of the PA 508 is ensured as the output signal y meets the PAPR goal as discussed above.

The input data signal x and the transmitted data signal y may comply with the requirements of the 3GPP new radio (NR) communication standard, the most recent at the time of this writing being Release 17, approved in December 2019. However, it is noted that the techniques disclosed herein are not limited to a specific communication standard, and instead may operate in accordance with any suitable communication standard, specification, and/or protocol. Such protocols may include cellular communications in accordance with the 3GPP standard, which may include both new radio (NR) and LTE communications, and may encompass mm-wave frequency bands in the range of 30-300 MHz. The techniques as discussed herein may be particularly useful for communication protocols that utilize carrier aggregation to transmit a composite signal that includes multiple carrier signals. Such protocols may additionally or alternatively utilize 60 GHz bands or other suitable frequency bands associated with any of the 802.xx Wi-Fi communication protocols, Wi-Gig, Global Navigation Satellite Systems (GNSS), etc.

CFR Algorithm: Overview

Figure 6A:
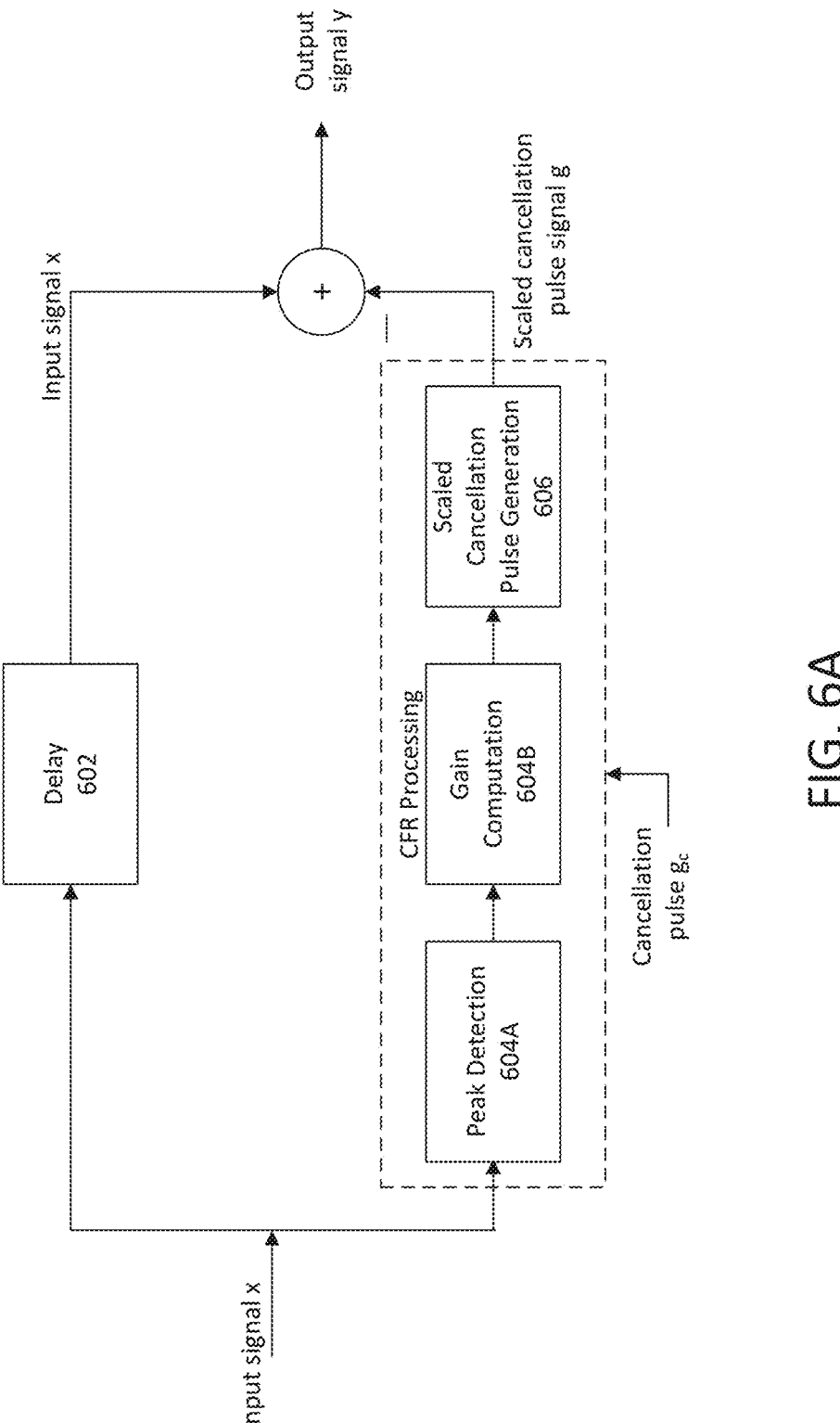
FIG. 6A illustrates a process flow identified with the execution of CFR operations on an input signal, in accordance with the disclosure.

FIG. 6A illustrates a process flow identified with the execution of a CFR algorithm on an input signal, in accordance with the disclosure. The process flows 600, 650 may alternatively be referred to herein as a CFR algorithm, with the various steps or functions being referred to as CFR operations. The process flow 600 as shown in FIG. 6A includes several blocks or modules, which may be considered a part of the transmitter circuitry 504 and thus represent any suitable number and/or type of hardware components, software components, or combinations of these to facilitate the respective functions as discussed herein. The process flow 600 as shown in FIG. 6A facilitates the elimination of or at least a significant reduction in peak regrowth compared to conventional CFR algorithms. To do so, the process flow 600 receives the input signal x, which may be identified with the input signal x as discussed above with respect to FIG. 5. The input signal x may represent a block of digital data samples of any suitable number, which represent the input signal x to be transmitted via any suitable transmit chain, such as the transmit chain 500 as noted herein.

The process flow 600 delays the input signal x via the delay block 602, which may represent one or more buffers or other suitable memory components configured to temporarily store the data samples for the input signal x until the final scaled cancellation pulse signal g is generated, as discussed in further detail below. Thus, the delay block 602 is configured to delay the input signal x to compensate for the CFR processing operations such that the scaled data samples identified with the cancellation pulse signal g are subtracted from the data samples identified with the input signal x in a time-aligned manner, thereby generating the output signal y.

In the implementation as shown in FIG. 6A, the input signal x as shown may represent a signal that has been sampled in accordance with an associated sampling rate. This sampling rate needs to be a minimum sampling value that is greater than the bandwidth of the input signal, and which may be performed using known data processing techniques. Thus, the input signal x may represent a signal that has been upsampled in accordance with any suitable sampling rate from a previous upsampling process that occurs in an earlier stage of the transmit chain 500 (not shown). As further discussed below with respect to the flow 650 of FIG. 6B, the input signal x may be further upsampled as part of the peak detection and gain computation CFR operations. Thus, further upsampling of the input signal is optional, although the subtraction of the final scaled cancellation pulse from the delayed input signal still occurs in either case at the same sampling rate of the input signal x. As a result, further upsampling of the input signal (and the cancellation pulse signal) as further discussed below enables the sampling rate of the input signal x to be further reduced (although still greater than the minimum sampling rate). In this way, when further upsampling of the input signal x is performed, the final scaled cancellation pulse signal is subtracted from the delayed input signal x to generate the transmit signal y at a lower sampling rate than would be possible without the use of upsampling to perform the peak detection and gain computation processes as discussed herein. Thus, the process flow as further discussed below with respect to FIG. 6B advantageously reduces the complexity of the CFR algorithm, as the subtraction of the final cancellation pulse occurs over the entire set of samples of the delayed input signal x, and reducing this number of samples saves considerable processing power.

Figure 6B:
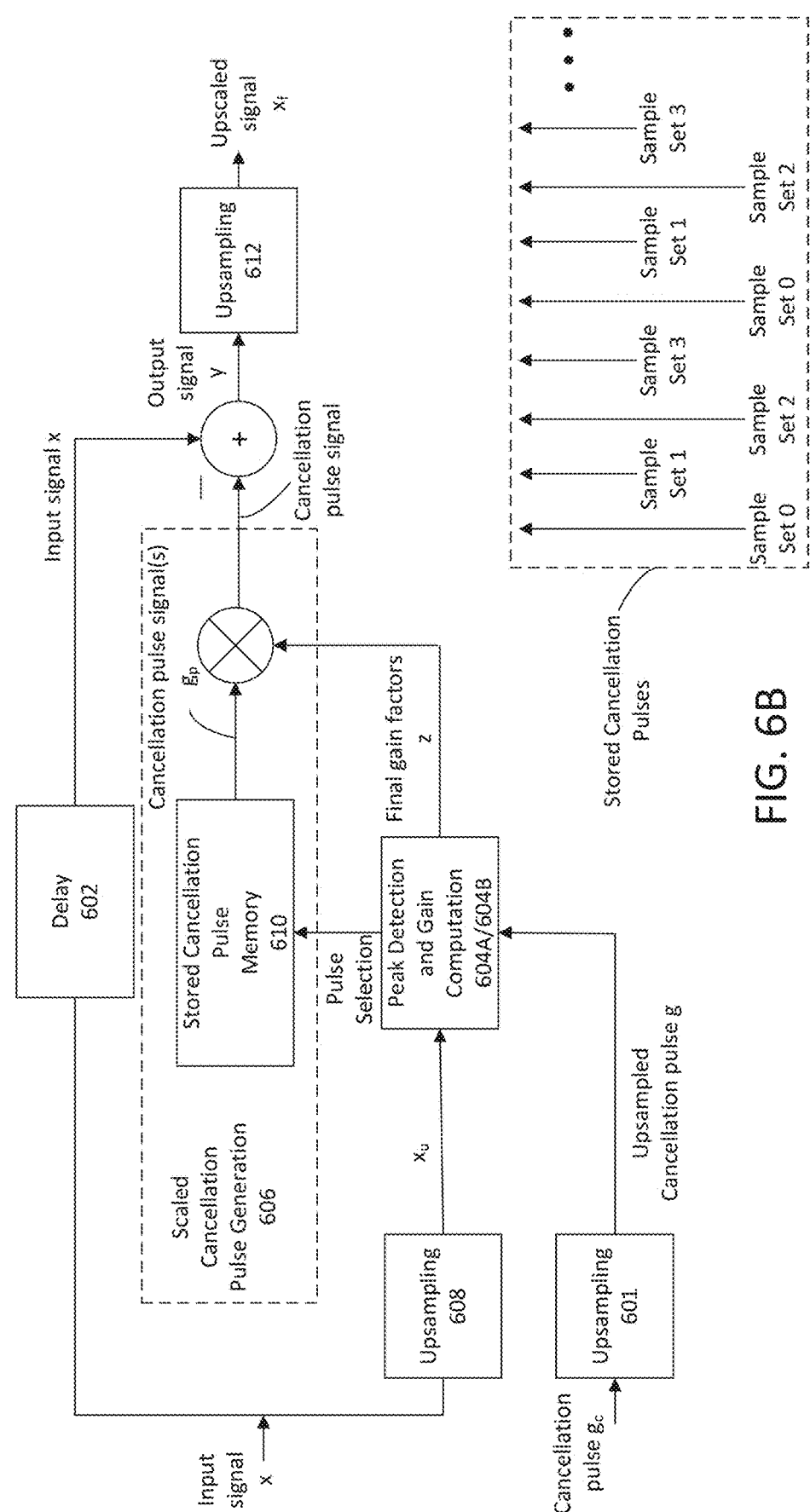
FIG. 6B illustrates additional details of the process flow identified with the execution of CFR operations as shown in FIG. 6A after further upsampling is performed on the input signal, in accordance with the disclosure.

Accordingly, the CFR operations as discussed herein that implement further upsampling of the input signal x as discussed with respect to the process flow 650 of FIG. 6B to allow for a lower sampling rate of the input signal x may be referred to herein as a "lower sampling rate CFR" algorithm, process flow, or technique. Moreover, the CFR operations as discussed herein that do not implement further upsampling of the input signal x as discussed with respect to the process flow 600 of FIG. 6A and require a higher sampling rate of the input signal x may be referred to herein as a "higher sampling rate CFR" algorithm, process flow, or technique.

In any event, i.e. regardless of the sampling rate of the input signal x, the peak detection block 604A functions to detect each sample in the input signal x that has a corresponding magnitude exceeding a predetermined threshold. The predetermined threshold may be determined or otherwise known a priori from the operating parameters of the power amplifier (PA) that is transmitting the output signal y. In various illustrative scenarios, the predetermined threshold may be a function of an upper transmission power limit of the PA or a threshold that is selected based upon this upper limit such as 90%, 95%, etc. of the maximum power limit. The predetermined threshold may be computed based upon the operating parameters of the PA in accordance with a particular signal configuration of the input signal x, such that specific PAPR conditions are met for a particular data transmission. Furthermore, although referred to herein as a "predetermined" threshold, this may be computed in accordance with each different signal transmission for which the CFR operations are performed. That is, the predetermined threshold used to identify the peak samples may be determined based upon a desired transmission power level, the configuration of the input signal, the operating parameters of the PA, etc.

Next, the gain computation block 606 computes a scaling factor for each peak sample in the input signal x, as discussed in further detail below. The scaling factor is indicative of a magnitude by which each peak sample exceeds the predetermined threshold value. The gain computation block 606 then uses the scaling factors identified with each detected peak sample, i.e. the samples identified via the peak detection block 604A, to perform a gain computation with respect to the detected peaks, with the scaling factors being updated as the algorithm progresses to converge to a final set of gain factors.

To do so, the gain computation block 606 functions to calculate a set of gain factors in two separate steps, with the first being referred to herein as a parallel gain computation or a first peak cancellation process, and the second being referred to herein as an iterative gain computation or a second peak cancellation process. The iterative gain computation may be unnecessary based upon the outcome of the parallel gain computation. In any event, the result of the parallel gain computation or, in some cases, both the parallel gain computation and the iterative gain computation, results in a set of final gain factors. The final gain factors represent a cumulative result of the scaling factors being updated as part of the parallel and iterative gain computation processes, and indicate the sample location and scaling factor of the peak samples that are identified as part of the gain computations.

The scaled cancellation pulse generation block 606 generates a final scaled cancellation pulse signal that is then subtracted from the delayed input signal samples provided via the delay block 602, resulting in a cancellation of all or a significant number of the signal samples in the input signal x that previously had a corresponding magnitude exceeding the predetermined threshold. As further discussed below, the final scaled cancellation pulse signal represents an aggregation of a set of scaled cancellation pulse signals. As further discussed below with respect to the process flow 650, when the peak detection process and the gain computation steps are performed on a further upsampled version of the input signal x, each one of the set of scaled cancellation pulse signals is generated by selecting a stored cancellation signal from memory that has a phase matching each respective gain factor. Each stored cancellation signal is then multiplied by each respective gain factor, and thus each one of the set of scaled cancellation pulse signals represents a multiplication of a respective stored cancellation pulse signal with a respective one of the set of gain factors.

However, for the higher sampling rate pulse cancellation used in the process flow 600, the input signal x is not further upsampled and thus the cancellation pulse signal $g_c$ used as part of the CFR processing operations as shown in FIG. 6A is likewise not further upsampled, and instead matches the sampling rate of the input signal x. In accordance with the higher sampling rate pulse cancellation in the process flow 600, a truncated version of the cancellation pulse signal $g_c$ is used for the gain computations in contrast to the truncated upsampled cancellation pulse signal g' used for the lower sampling rate pulse cancellation in the process flow 650. Thus, the phase selection process described herein with reference to the process flow 650 is not needed for the process flow 600.

Again, the final scaled cancellation pulse signal has a sampling rate matching that of the input signal x for both the process flows 600, 650, and represents an aggregate cancellation pulse. The final scaled cancellation pulse signal is thus subtracted from the delayed input signal x to eliminate or at least significantly reduce the peak samples in a single iteration to generate the output signal or transmit signal y. Thus, the resulting output signal y constitutes a block of data samples having a maximum magnitude that is equal to or less than the predetermined threshold value, thereby optimizing the PAPR goal in this manner. It is noted that because the final scaled cancellation pulse signal is subtracted from the delayed input signal x in the process flow 600 at a higher sampling rate, the output signal y need not be (but optionally could be) further upsampled, in contrast to the use of the upsampling block 612 as shown in FIG. 6B.

In this way, the gain computations are executed such that the resulting final scaled cancellation pulse signal functions to cancel all peaks in the input signal samples in a single iteration. Furthermore, the gain computation block 604B is executed in an efficient manner because the gain computations are limited to the samples identified via the peak detection block 604A, and these peak samples need not be re-detected. That is, although multiple iterations of the gain computation may be executed, the peak detection and the overall gain computation process are performed once for each block of input data samples.

CFR Algorithm: Initial Stage

FIG. 6B illustrates additional details of the process flow identified with the execution of a CFR algorithm as shown in FIG. 6A, in accordance with the disclosure. Again, the various CFR operations may be performed via hardware components (such as an ASIC or FPGA), software operations (such as those executed via the processing array discussed herein with respect to FIG. 3), or combinations of these. As noted above for the process flow as shown in FIG. 6A, the process flow 650 as shown in FIG. 6B likewise includes several blocks or modules, which may be considered, unless otherwise noted, a part of the transmitter circuitry 504 and thus represent any suitable number and/or type of hardware components, software components, or combinations of these to facilitate the respective functions as discussed herein. Thus, the process flow 650 may likewise alternatively be referred to herein as a CFR algorithm, with the various steps or functions being referred to as CFR operations.

Again, the final pulse cancellation signal subtraction used in the process flow 650 is performed at a lower sampling rate than that of the process flow 600. However, the CFR operations and the overall CFR algorithm identified with the process flows 600 and 650 are otherwise the same, with exceptions as noted herein that include the use of cancellation pulses and truncated cancellation pulses having different sampling rates, as well as the use of the stored set of cancellation pulses for the process flow 650 versus the use of a single stored cancellation pulse for the process flow 600.

To prevent peak regrowth, the process flow 650 as shown in FIG. 6B includes an upsampling of the input signal x via the upsampling block 608. However, although referred to herein as the upsampled input signal $x_u$, it will be understood that the input signal x may already be upsampled, and thus the upsampled input signal $x_u$ may be considered a further upsampling of the input signal x in such scenarios. The upsampling may be performed in accordance with any suitable upsampling factor U and in accordance with any suitable upsampling scheme to provide the upsampled input data signal $x_u$. As noted above, the input signal x may already constitute a set of data samples that have been subjected to upsampling and modulation via one of the channelized transmit paths, which is shown and discussed with respect to FIG. 5. Again, the upsampling block 608 may provide an additional upsampling of the input signal x for the various CFR operations as shown and discussed herein with reference to FIG. 6B. In an illustrative and non-limiting scenario, the upsampling block 610 may perform upsampling via interpolation, with the upsampling factor being 2, 4, 8, etc. Thus, if the input signal x is represented as a set of N number of data samples, with N being equal to 1024, 2048, etc. data samples, then the upsampled input signal $x_u$ represents a set of N×U number of data samples in accordance with the upsampling factor U such as 2048, 4096, etc.

The process flow 650 also receives a cancellation pulse, which may be referred to herein as an original cancellation pulse, and is denoted as shown in FIG. 6B as $g_c$. The cancellation pulse $g_c$ may be configured based on the signal configuration of the input signal x. That is, the original cancellation pulse may include a number of data samples, a corresponding sampling rate, shape, etc., that is selected based upon parameters of the input signal x. That is, the original cancellation signal may be generated in any suitable manner or retrieved from a suitable memory location, and may be configured in accordance with any suitable techniques, including known techniques. In an illustrative scenario, the original cancellation pulse may be identified with a cancellation pulse that is used as part of the first iteration of a conventional CFR algorithm as discussed herein with respect to FIG. 4. The original cancellation pulse signal may be generated based upon the transmission scheme of the input signal x, which may include a number of carriers, a bandwidth, a spectral location of each carrier, etc. That is, the original cancellation signal may be generated based upon a Fourier transform relationship with the spectral configuration of the input data signal. In any event, the original cancellation pulse may be upsampled via the upsampling block 601 in a manner similar to the upsampling of the input signal x as noted above. The upsampling process may use the same upsampling factor U as the upsampling block 608 with respect to the input signal x. The upsampled cancellation pulse, denoted g, is further utilized in the CFR algorithm, as discussed below. A non-limiting and illustrative scenario of the upsampled cancellation pulse signal g is shown in FIG. 8B.

The peak detection and gain computation block 604A/604B is configured to first perform peak detection on the upsampled input signal $x_u$. Again, it is noted that for the process flow 600, the peak detection and gain computation block 604A/604B uses the input signal x and the cancellation pulse signal $g_c$, whereas for the process flow 650 the peak detection and gain computation block 604A/604B uses the (further) upsampled input signal $x_u$ and the upsampled cancellation pulse signal g. Otherwise, the CFR processing operations performed by the peak detection and gain computation block 604A/604B as discussed herein with respect to FIG. 6B are the same for both of the processing flows 600, 650.

Again, the upsampled input signal $x_u$ represents a set of N×U number of data samples, with each data sample corresponding to a sample number (also referred to as a sample location) within the sample block and a magnitude value. To provide an illustrative and non-limiting scenario, each data sample identified with the upsampled input signal $x_u$ may represent a complex value based upon the IQ data provided by the data source 502. Therefore, each data sample identified with the upsampled input signal $x_u$ may have a corresponding magnitude that may be evaluated in accordance with any suitable techniques, including known techniques. As one illustrative scenario, the predetermined threshold value may be represented as A, which again may be selected based upon the operating parameters of the relevant power amplifier used for data transmission. Thus, the peak detection and gain computation block 604 may be configured to store each sample $x_{u,i}$ identified with the upsampled input signal $x_u$ having a magnitude exceeding the predetermined threshold value A, which may be represented as Equation 1 below as follows:

$$|x_{u,i}|^2 > A^2, \text{store } n_i(\text{location}), p_i = x_{u,i}(\text{sample value}). \qquad \text{Eqn. 1:}$$

The location $n_i$ in this context may represent the sample number within the set of samples identified with the upsampled input signal $x_u$, whereas the sample value $p_i$ represents that sample's corresponding magnitude. Thus, the peak detection and gain computation block 604A/604B is configured to identify each sample $n_i$ associated with a peak, i.e. each sample having a magnitude that exceeds the predetermined threshold value A, which are referred to herein as "peak samples." The peak detection and gain computation block 604 then stores each of these peak samples in any suitable memory, such as the memory 504B.

The peak detection and gain computation block 604 is configured to compute a scaling factor for each of the stored peak samples. The scaling factor is a number indicative of a magnitude by which each peak sample exceeds a threshold value, which may be expressed as a complex value. The scaling factor may be represented as $s_i$, with the index i referring to each unique peak sample that was detected. Thus, the scaling factor for each stored peak sample may be computed in accordance with Equation 2 below as follows:

$$s_i = p_i - \frac{p_i}{|p_i|} A, \qquad \text{Eqn. 2}$$

wherein $p_i$ represents the magnitude of each respective peak sample $n_i$.

CFR Algorithm: Parallel Gain Computation and Cluster Peak Sample Cancellation Stage By detecting the peak samples in the upsampled input signal $x_u$ in contrast to the original input signal x, the likelihood of peak regrowth is reduced. However, to further reduce the complexity and processing power required to execute the CFR algorithm, the peak detection and gain computation block 604A/604B is configured to first perform a peak clustering operation. To do so, the peak detection and gain computation block 604A/604B is configured to implement a predetermined delta value and then, using this value, to "cluster" peak samples such that the difference between sample locations within each cluster is less than the predetermined delta value. In other words, each cluster spans a number of samples that is equal to twice the predetermined delta value. The predetermined delta value may be selected based upon the sample length of the truncated upsampled cancellation pulse g'. In one non-limiting and illustrative scenario, the predetermined delta value may be selected as half of the number of samples in the truncated upsampled cancellation pulse g' to ensure that the parallel cancellation of each cluster peak via the use of the scaled truncated upsampled cancellation pulse g' does not interfere with other adjacent clusters, which is further discussed below. Thus, the predetermined delta value may be selected such that clusters do not overlap with one another, with each cluster spanning a number of samples equal to the length of the truncated cancellation pulse. This process is further illustrated with reference to FIG. 7A, which illustrates an upsampled signal with identified peak samples and clusters, in accordance with the disclosure.

Figure 7A:
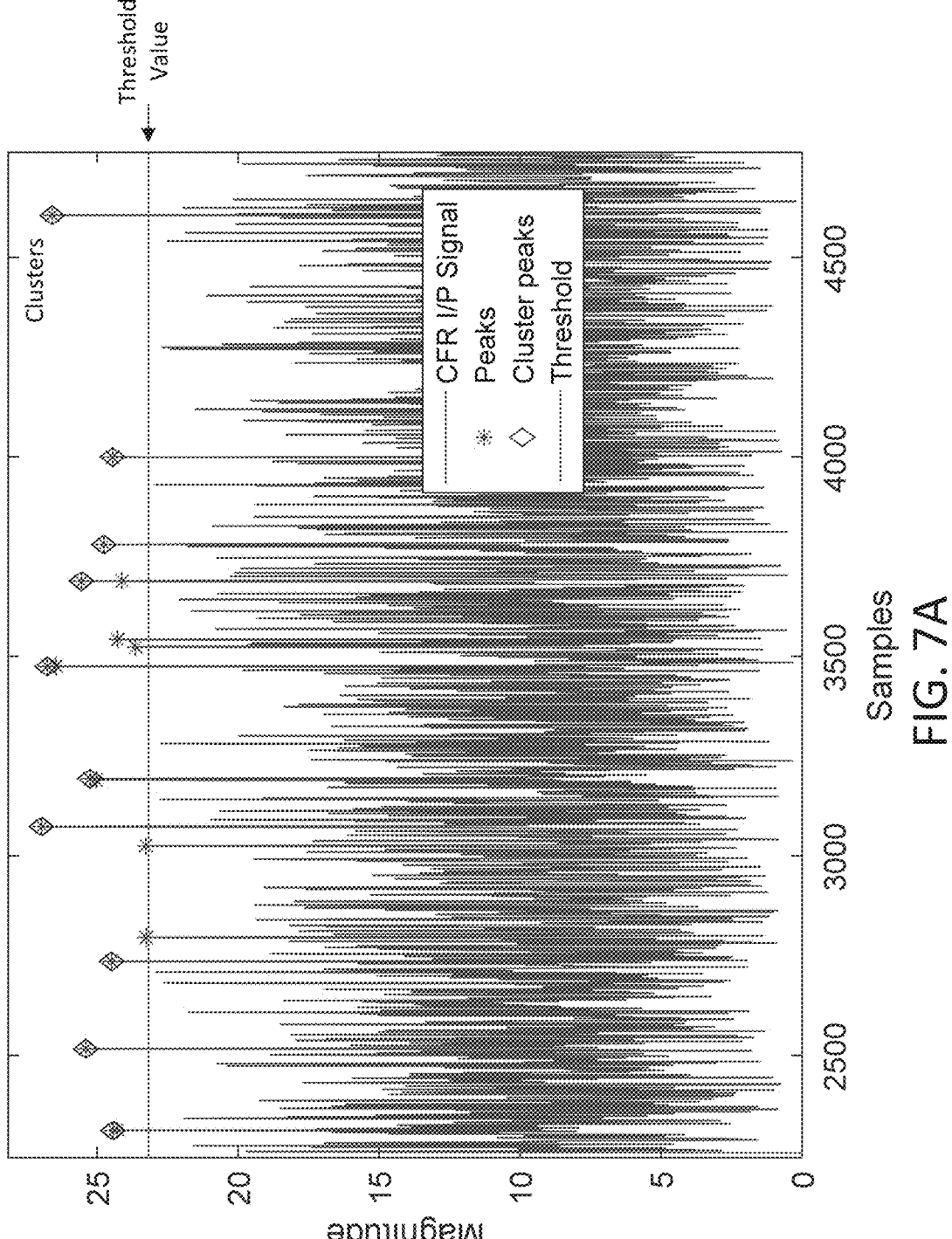
FIG. 7A illustrates an upsampled signal with identified peak samples and clusters, in accordance with the disclosure.
Figure 8C:
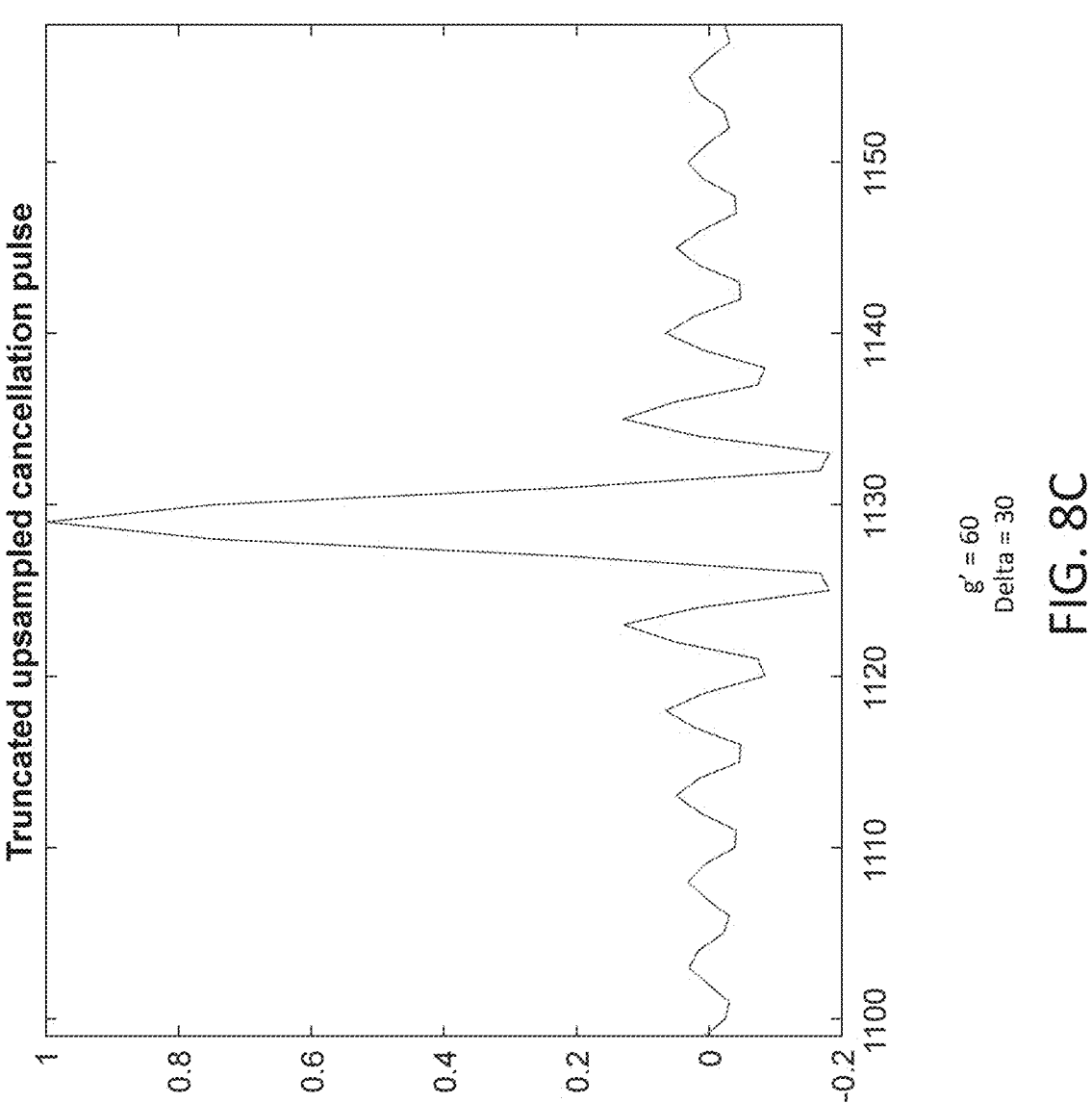
FIG. 8C illustrates a truncated upsampled cancellation pulse, in accordance with the disclosure.

For the non-limiting and illustrative scenario as shown in FIG. 7A, the determined delta value is selected as 30 samples, and the sample length of the truncated upsampled cancellation pulse g' is 60 samples, i.e. as shown in FIG. 8C. Thus, and as shown in FIG. 7A, each cluster spans 60 samples. Therefore, a total number of peak samples $N_p$ is detected as shown in FIG. 7A designated via the '*' shaped markers, which correspond to the peak detection process as discussed above. The total number of peak samples $N_p$ are then grouped into a number of peak clusters $N_c$ based upon the delta value, with $N_p = 18$, and $N_c = 10$ clusters being shown in FIG. 7A in this illustrative scenario, with $N_p > N_c$. The peak detection and gain computation block 604A/604B may then identify the peak sample in each cluster having the highest magnitude, which is referred to herein as a "cluster peak sample." Thus, there are a total number of $N_c$ cluster peak samples identified as part of this process, with the number of cluster peaks $N_c$ being a subset of the total number of peak samples $N_p$.

The CFR algorithm as discussed herein may compute a corresponding scaling factor $s_i$ for each of the $N_c$ number of cluster peak samples, in contrast to the larger total number $N_p$ of detected peak samples. Then, the peak detection and gain computation block 604A/604B utilizes this smaller subset of scaling factors corresponding to the cluster peak samples to compute a set of gain factor, with one gain factor per cluster peak sample. The term "coefficients" may be used herein synonymously with the term "gain factors," which may be represented as z. The gain factors are then generated based upon the scaling factors. That is, as the scaling factors identify a magnitude by which peak sample exceeds the predetermined threshold value, the gain factor for that same sample is the value that, when multiplied by the corresponding sample in the truncated upsampled cancellation pulse g' and then subtracted from the input signal x, results in a reduction of that peak sample's respective magnitude to less than or equal to the predetermined threshold value.

Therefore, the gain factors may be represented as a vector of size $1 \times N_p$. The coefficients (such as those identified with a complex number) or gain factor $z_i$ for each cluster peak sample i may thus be computed in this manner in accordance with Equation 3 below as follows:

$$z_i = z_i + s_i \qquad \text{Eqn. 3:}$$

Initially (prior to the parallel gain computation as further discussed below), all the gain factors z in the set of gain factors are zero. Then, after the peak clusters $N_c$ are identified, the gain factors are updated such that the number of non-zero gain factors in the set are equal to the number of peak clusters $N_c$, with the remaining gain factors having a zero value. Thus, at this stage, the non-zero gain factors are set to a value that is equal to the scale factors of the corresponding cluster peak samples. Therefore, at this stage in the process flow 650, the initial set of gain factors z are equivalent to the scaling factors $s_i$ identified with each of the $N_c$ number of cluster peak samples as noted above. In other words, Equation 3 above is further referenced below, and is used to iteratively update the gain factors using the updated scaling factor from the previous iteration. However, due to the non-overlap among clusters, the parallel gain computation process is performed as a single iteration on all cluster peaks in parallel, and thus the gain factors and scaling factors are equal to one another at this stage in the process flow 650.

Once the gain factors are computed for each cluster peak sample, the gain factor $z_i$ for each cluster peak sample i is used to scale a truncated upsampled cancellation pulse to generate a scaled truncated upsampled cancellation pulse, which is then subtracted from the upsampled input signal $x_u$. This scaling operation includes multiplying the scaling value scaling factors $s_i$ for each cluster peak sample by the matching sample number in the truncated upsampled cancellation pulse, i.e. the sample number in the truncated upsampled cancellation pulse that matches that of the cluster peak sample in each cluster. Each respective scaled truncated upsampled cancellation pulse is then subtracted from each corresponding cluster of samples in the input signal $x_u$ in parallel with one another. This subtraction operation results in a reduction of each cluster peak sample's respective magnitude to less than or equal to the predetermined threshold value.

The truncated upsampled cancellation pulse, denoted herein as g', may represent a truncation of the upsampled cancellation pulse g as shown in FIG. 8B, i.e. the ends of the upsampled cancellation pulse g are truncated and only the center portion of the upsampled cancellation pulse g is used. In the illustrative and non-limiting scenario as shown in FIG. 8C, the truncated upsampled cancellation pulse g' is shown comprising a total of 120 samples. However, in the illustrative and non-limiting scenario as shown in FIG. 8C, the truncated upsampled cancellation pulse g' is shown comprising a total of 60 samples. Thus, the overall length of the truncated upsampled cancellation pulse g' may be selected based upon the particular application. It is noted that the truncated upsampled cancellation pulse g' and corresponding scaled truncated upsampled cancellation pulse generated via multiplication with each of the respective gain factors z that is used as part of the parallel and iterative gain computations of the process flow 650 is in contrast with the subtraction of the "final" scaled cancellation pulse signal that results in the generation of the output signal y as shown in FIG. 6B. Therefore, the truncated upsampled cancellation pulse and shown in FIG. 8B, as well as the resulting scaled truncated upsampled cancellation pulses generated via multiplication with each of the gain factors z, may alternatively be referred to as an "intermediate" truncated upsampled cancellation pulse and "intermediate" scaled truncated upsampled cancellation pulses.

Figure 7B:
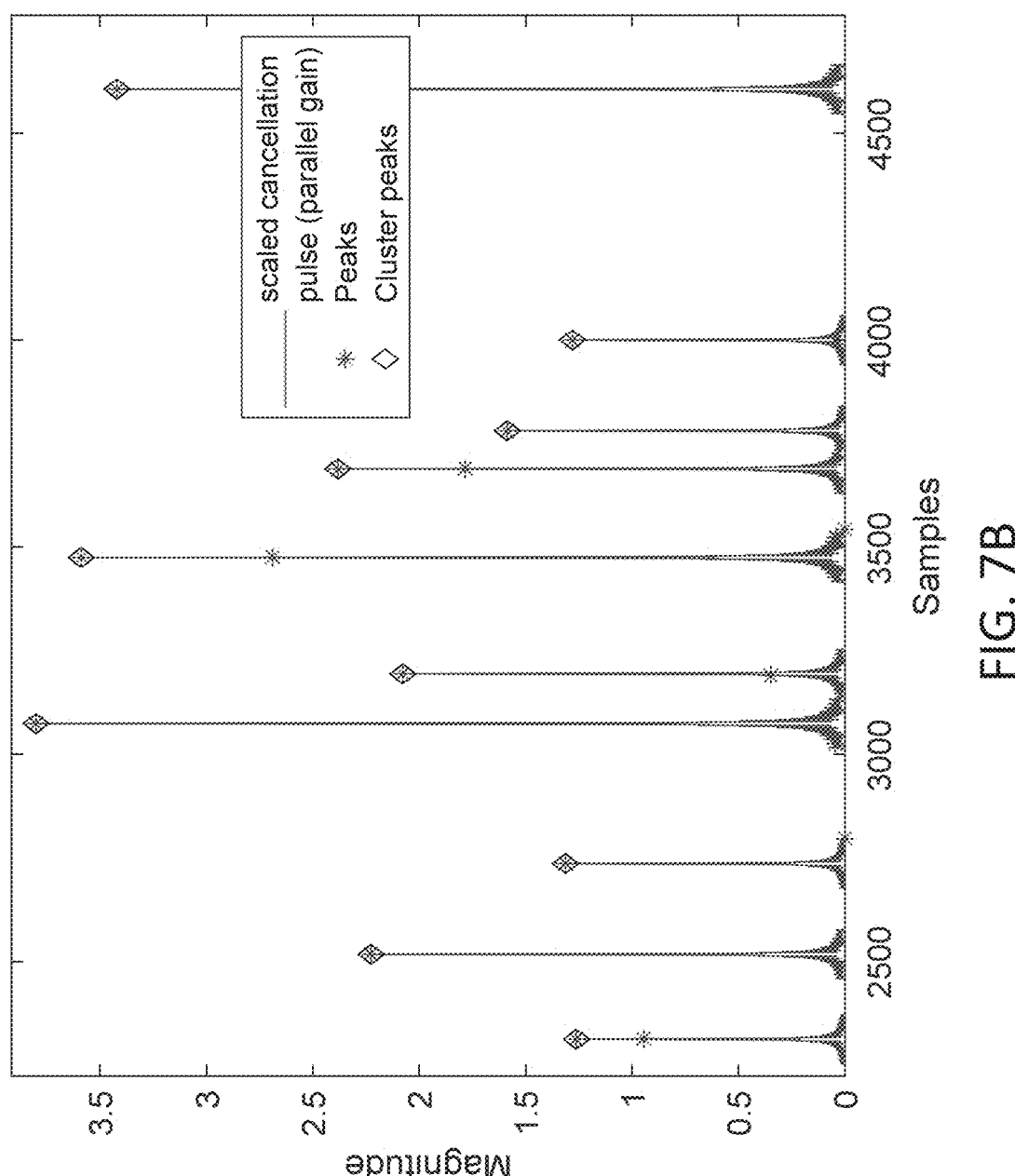
FIG. 7B illustrates the parallel application of a set of scaled truncated upsampled cancellation pulses, in accordance with the disclosure.

Thus, the peak detection and gain computation block 604A/604B is configured to generate a set of scaled truncated upsampled cancellation pulses by multiplying each one of the initial set of gain factors z by the truncated upsampled cancellation pulse g', which results in a set of scaled truncated upsampled cancellation pulses, each including a scaled sample matching the number of the respective cluster peak sample that is to be cancelled. The peak detection and gain computation block 604A/604B separately and independently applies each one of the scaled truncated upsampled cancellation pulses in this way to the upsampled input signal $x_u$. Again, this is done by subtracting each scaled truncated upsampled cancellation pulse from the upsampled input signal $x_u$. Thus, the center location of each scaled truncated upsampled cancellation pulse generated in this manner corresponds to the same sample location of the cluster peak sample identified with the scaling factor used to generate that respective scaled truncated upsampled cancellation pulse. Thus, the gain factor value is such that, when combined with the magnitude of a respective cluster peak sample location in the upsampled input signal $x_u$, results in a reduction of the magnitude of that cluster peak sample to equal to or less than the predetermined threshold value. An illustrative and non-limiting scenario for this process is shown in FIG. 7B, which shows an aggregation or superposition of a set of scaled truncated upsampled cancellation pulses that are generated by multiplying the gain factor identified with each respective cluster peak sample as shown in FIG. 7A with the truncated upsampled cancellation pulse as shown in FIG. 8C. It is noted, however, that the subtraction operation may be limited to only those samples identified with all the peaks identified in each of the clusters.

It is noted that the clustering of the peak samples ensures a non-overlap among the different cluster peak samples, and the relationship between the predetermined delta value and the length of the scaled truncated upsampled cancellation pulses ensures that the application of a scaled truncated upsampled cancellation pulse to one cluster does not impact another cluster. Thus, the samples identified with each cluster may be processed independently from the other clusters. That is, the process of computing the coefficients $z_i$ for each cluster peak sample, as well as generating and subtracting each of the scaled truncated upsampled cancellation pulses from the input signal x, may be performed independently in parallel (i.e. concurrently) with one another, for each of the $N_c$ cluster peak samples identified above.

Figure 7C:
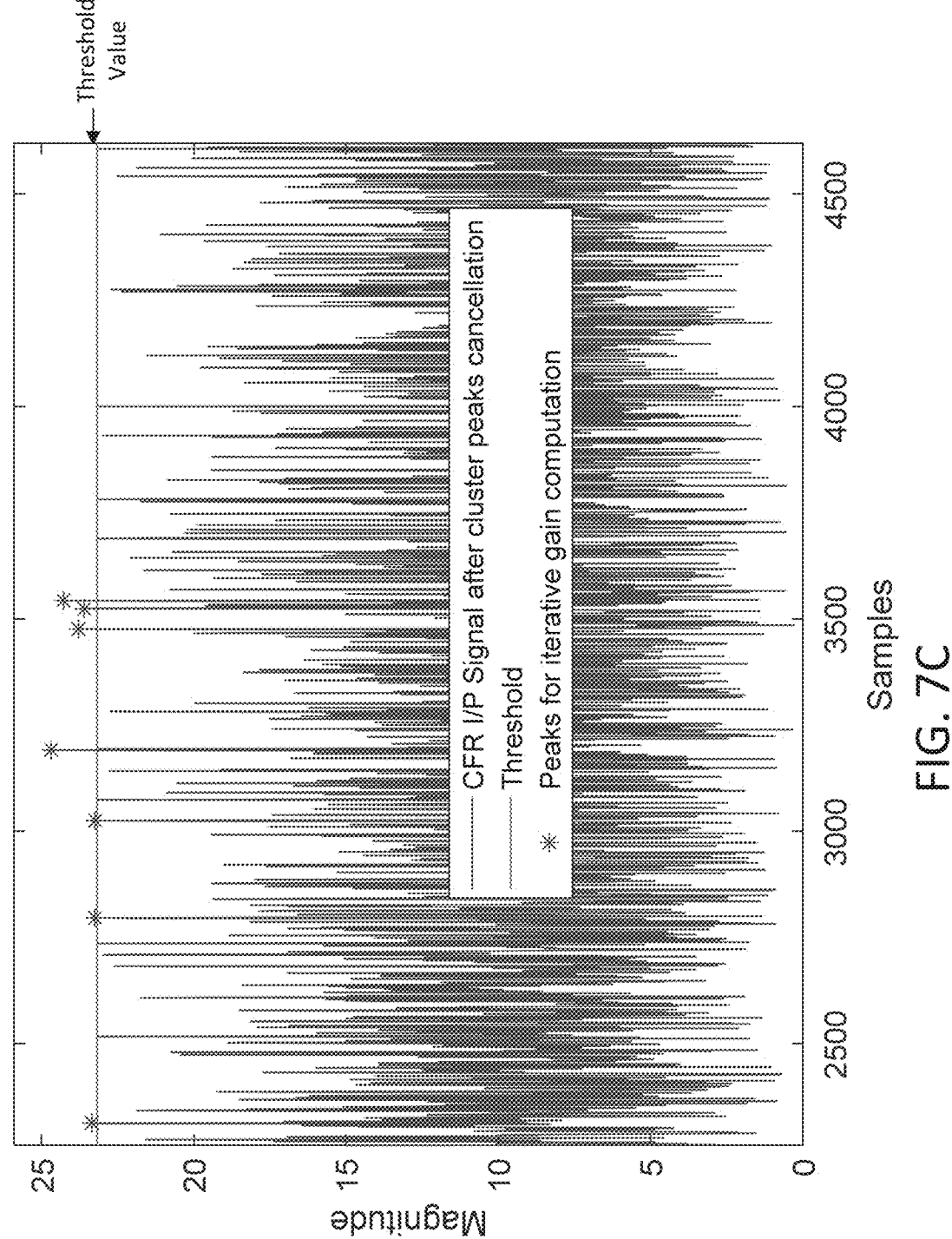
FIG. 7C illustrates a resulting upsampled input signal after the application of scaled truncated pulses, in accordance with the disclosure.

After applying each of the scaled truncated upsampled cancellation pulses to each cluster peak sample in this way, many of the number $N_p$ of peak samples may be eliminated in addition to the number $N_c$ of peak samples. This is a result of the proximity of the other peak samples to the cluster peak samples. An illustrative and non-limiting scenario of the resulting upsampled input signal $x_u$ after the application of the scaled truncated upsampled cancellation pulses is shown in FIG. 7C.

At this stage, the CFR algorithm may compute updated peak samples and their corresponding values. To do so, the peak detection and gain computation block 604 is configured to calculate, from the larger total number $N_p$ of detected peak samples that were previously identified, which of these samples still exceeds the predetermined threshold value, as shown in FIG. 7C. Thus, additional peak detection is not required, as the peak detection and gain computation block 604A/604B restricts these computations to the previously-identified peak samples $N_p$. The peak detection and gain computation block 604 may thus identify the updated peak samples $p_i$ that still remain after the application of the scaled truncated upsampled cancellation pulses, as well as their respective magnitudes, in accordance with Equation 4 below as follows:

$$p_i = p_i - s_m g'_{i-m}, \text{ where } g' \text{ is the truncated upsampled}$$
$$\text{cancellation pulse.} \qquad \text{Eqn. 4:}$$

The scaling factor $s_m$ denotes the maximum scaling factor value within each of the clusters, i.e. the scaling factor identified with each cluster peak sample. Thus, this step represents a parallel updating of the scaling factors for all peak samples $N_p$ by independently computing the scaling factors of each of the peak samples $N_p$ within each respective cluster after the application of the scaled truncated upsampled cancellation pulse. In other words, the scale factor values may be updated on a per cluster basis independently and in parallel with the updating of the scaling factors for the peak samples identified in the other clusters. Once the magnitude of each remaining peak sample is computed in this manner, the scaling factor $s_i$ for each remaining peak sample, such as those shown in FIG. 7C, is then updated in accordance with Equation 2 above.

It is noted that in some scenarios the subtraction of set of scaled truncated upsampled cancellation pulses from the upsampled input signal $x_u$ may eliminate all peak samples, and thus additional iterative gain computations may not be necessary. In this case, the final gain factors z output from the peak detection and gain computation block 604A/604B as shown in FIG. 6B are those computed above, i.e. the scaling factors $s_i$ identified with each of the $N_c$ number of cluster peak samples as noted above.

In such a case, the process flow 650 comprises accessing the cancellation pulse memory 610, which may store sets of phase-shifted cancellation pulses having a predetermined shape and sample size. In a non-limiting and illustrative scenario, each phase-shifted cancellation pulse may be comprised of a number of samples equal to the number of data samples identified with the original cancellation pulse $g_c$. Thus, the cancellation pulse memory 610 may store a number of cancellation pulses equal to the upsampling factor U. That is, the cancellation pulse memory 610 may store a number of the cancellation pulses $g_p$, each being phase-shifted with respect to one another by a period of $(1/U)$ in terms of the original sampling rate of the input signal x. Thus, for an upsampling rate U of 4, the cancellation pulse memory 610 may store four cancellation pulses $g_c$, each being offset from one another by $\frac{1}{4}$ of the original input signal sampling rate, as illustrated in the inset of FIG. 6B. The cancellation pulses stored in the memory 610 may thus constitute sets of interleaved data samples, each having a sampling rate in accordance with the sampling rate of the original cancellation pulse $g_c$ versus the upsampled rate of the cancellation pulse g as shown in FIG. 8B. Therefore, when each of sets 0, 1, 2, and 3 of the phase-shifted cancellation pulses stored in the cancellation pulse memory 610 are interleaved with one another, the upsampled cancellation pulse g as shown in FIG. 8B is realized. That is, each phase-shifted cancellation pulse stored in the cancellation pulse memory 610 is obtained from the upsampled cancellation pulse g by sampling a subset of the samples of the upsampled cancellation pulse g. For instance, the phase-shifted cancellation pulse sample set 0 may comprise samples that are obtained by sampling the first sample, and then every $(U+1)$th sample thereafter, whereas the phase-shifted cancellation pulse sample set 1 may comprise samples that are obtained by sampling the second sample, and then every $(U+1)$th sample thereafter, and so on, with U representing the upsampling factor.

Thus, to cancel the peaks in the input signal x as part of the CFR algorithm, each cancellation pulse $g_p$ is selected from the cancellation pulse memory 610 that matches the phase of the sample in the upsampled input signal $x_u$ corresponding to the gain factor for that peak sample. To provide a non-limiting and illustrative scenario, the final set of gain factors z may identify values associated with identified peak sample at locations S1, S2, and S3 in the upsampled input signal $x_u$, as the peak detection and gain computations were performed using the upsampled input signal $x_u$. The final cancellation process, however, occurs at the original input signal sampling rate. Therefore, the location S1, S2, and S3 of each peak sample in the upsampled input signal $x_u$ is mapped to each cancellation pulse stored in the cancellation pulse memory 610 that contains a sample location matching that phase, i.e. contains that same sample location in its set of samples. Thus, depending upon the location of the identified peak samples in the upsampled input signal $x_u$, each cancellation pulse selected from the cancellation pulse memory 610 may be the same phase (if all locations S1, S2, and S3 in the upsampled input signal $x_u$ are contained in the same phase-shifted cancellation pulse stored in the memory 610) or different phases, as the case may be.

However, each cancellation pulse $g_p$ first needs to be scaled such that, when subtracted from the input signal x, each peak sample in the input signal sample x exceeding the predetermined threshold value is canceled, i.e. no longer exceeds the predetermined threshold value. Thus, each gain factor z is multiplied by a respective cancellation pulse $g_p$ that is selected from the pulse memory 610 to generate the final cancellation pulse signal. Each respective cancellation pulse $g_p$ is then scaled in accordance with the gain factor centered on a sample location matching that of the respective peak sample to be canceled, as discussed above. The final cancellation pulse signal thus comprises an aggregation of a set of scaled cancellation pulse signals, each representing a multiplication of a respective cancellation pulse signal from the memory 610 (with the appropriate phase) with a respective gain factor from the final gain factors z. In a similar manner as shown in FIG. 7B (although at the original sampling rate of the input signal x in this case), the final cancellation pulse signal is then subtracted from the delayed version of the input signal x as shown in FIG. 6B. In this case, however, each sample in the final cancellation pulse is subtracted from each sample in the delayed input signal x. It is thus noted that although the upsampled input signal $x_u$ and upsampled cancellation pulse g are used to compute the final gain factors z, the actual cancellation of the input signal x is performed using the original input signal x and the final cancellation pulse signal, which have a sampling rate that matches that of the input signal x and the original cancellation pulse $g_c$. The output signal y thus represents a CFR of the input signal x, in which all the peak samples have been eliminated or at least significantly reduced in number.

The output signal y may then be upsampled via the upsampling block 612 in a manner similar to the upsampling of the input signal x as noted above. The upsampling block 612 may perform interpolation using half band filters to provide an upsampled data signal, which may be identified with the transmit signal in FIG. 5 that is coupled to the DAC 506 and then the PA 508 for transmission via the antenna 510.

Again, it is noted that the upsampling of the output signal via the upsampling block 612 is not needed for the process flow 600. Moreover, for the process flow 600 the stored cancellation pulse memory 610 may store the cancellation pulse signal $g_c$ versus the storage of multiple phases of the cancellation each cancellation pulse $g_p$ for the process flow 650. Thus, the process flow 600 may alternatively scale the cancellation pulse signal $g_c$ using the final gain factors z as discussed herein to derive the final cancellation pulse signal, and need not select from among the different phases as a single cancellation pulse signal $g_c$ is used. In any event, the final cancellation pulse signal is then subtracted from the delayed input signal x for both of the process flows 600, 650.

However, in the non-limiting and illustrative scenario as discussed below, it is assumed that some peak samples may still remain after the parallel gain computation process is performed, as shown in FIG. 7C. Thus, the CFR algorithm in accordance with the disclosure includes the selective application of an iterative gain computation, as discussed in further detail immediately below.

CFR Algorithm: Iterative Gain Computation Stage

When peak samples still remain in the upsampled input signal $x_u$, the peak detection and gain computation block 604A/604B is configured to iteratively compute the gain factors z. This iterative process may continue for $i=1:N_I$, with $N_I$ representing a number of iterations equal to either a maximum number or a number of iterations required to eliminate all peak samples in the upsampled input signal $x_u$, whichever occurs first. The iterative gain process described in this stage may be performed in a similar manner as the parallel gain computation stage described above. However, instead of processing each set of clusters in parallel, the iterative gain computation stage is sequentially executed and treats the entire set of samples within the upsampled input signal $x_u$ as one cluster.

That is, the iterative gain computation process functions to identify the remaining peaks of the previously identified $N_p$ number of peak samples, and then utilizes the scaling factor from the peak sample having the largest magnitude to update the previous gain factors, applying the scaled truncated upsampled cancellation pulse (by subtracting the scaled sample in the scaled truncated upsampled cancellation pulse from the sample in the upsampled input signal $x_u$ matching that of the peak sample having the largest magnitude), and then re-updating the peak sample locations and scaling factors. This process is repeated iteratively until a set of gain factors are computed that result in the elimination of all the previously identified peaks $N_p$ or until a maximum number of iterations is reached. Thus, the iterative gain computation process described in this Section functions to update the set of gain factors computed via the parallel gain computation process noted above to yield a final set of gain factors. This final set of gain factors represents respective values that are multiplied by respective samples to generate the final cancellation pulse signal.

Again, the final cancellation pulse represents a set of scaled cancellation pulses, each comprising samples that, when subtracted from the matching samples in the (delayed) input signal x, reduce those samples to less than or equal to the predetermined threshold value. Thus, the final set of gain factors function to reduce the magnitude of each remaining peak sample $N_p$ to less than or equal to the predetermined threshold value. That is, each one of the final set of gain factors represents a value that, when multiplied by the truncated upsampled cancellation pulse to generate a scaled truncated upsampled cancellation pulse that is subtracted (i.e. specific samples of which are subtracted matching the peak sample locations to be cancelled) from the upsampled input signal $x_u$, reduces the magnitude of each peak sample to less than or equal to the threshold value.

The peak detection and gain computation block 604A/604B is configured to identify, for each iteration, the largest magnitude peak sample from among the remaining peak samples. Next, the gain factor z is updated for the highest magnitude peak sample using, as the gain factor z, the updated scaling factor $s_i$ computed for that same peak sample in accordance with the updated peak magnitudes evaluated via Equation 4 above, i.e. at the end of the parallel gain computation stage. A scaled truncated upsampled cancellation pulse is then generated by multiplying the truncated upsampled cancellation pulse by the updated gain factor z identified with the highest magnitude peak sample. Thus, this gain updating step may be performed in accordance with Equation 4 above, which includes subtracting one or more samples in the scaled truncated upsampled cancellation pulse from matching peak samples in the upsampled input signal $x_u$.

Next, the peak detection and gain computation block 604A/604B is configured to update all the remaining peak sample values by computing the magnitude of each of the peak samples $N_p$ and identifying the peak samples that still remain. An updated scaling factor $s_i$ for each remaining peak sample is then computed in accordance with Equation 2 above, as well as updated gain coefficients z for each remaining peak in accordance with Equation 5 below.

$$z_i = z_i + s_m \qquad \text{Eqn. 5:}$$

That is, the gain factor in the iterative gain computation stage cumulatively updates the gain factor in each iteration using the updated scaling factor identified with the largest magnitude peak sample from the previous iteration. An updated scaling factor $s_i$ for each remaining peak sample is then computed in accordance with Equation 2 above, as well as updated gain coefficients z for each remaining peak in accordance with Equation 5. This process is then repeated until all peak samples have been eliminated or the maximum number of iterations has been completed.

Thus, when the iterative gain computation stage is implemented, the updated gain factors computed at the end of the iterative gain computation stage are used as the final gain factors z output from the peak detection and gain computation block 604A/604B as shown in FIG. 6B. Again, these final gain factors z are then used to scale each one of a set of stored peak cancellation pulses as discussed above based upon phase matching to generate the final cancellation pulse signal g, which represents an aggregation of sets of cancellation pulses as noted above. Thus, the iterative gain computation process is used such that the final cancellation pulse signal, when subtracted from the input signal x (i.e. when samples in each set of scaled cancellation pulses are subtracted from the matching sample locations in the delayed input signal x), removes any remaining or regrown peaks that would otherwise be present, i.e. those that would not otherwise be eliminated if only the parallel gain computation phase was used. Advantageously, because the final cancellation pulse signal may comprise an aggregation of scaled cancellation pulses, a single iteration, i.e. a single subtraction of the final cancellation pulse signal from the input signal x eliminates all (or at least significantly reduces) the peak samples in the input signal x. In this way, the CFR algorithm provides a significant reduction in complexity and processing operations and provides better performance compared to conventional CFR algorithms.

Reduced Cancellation Pulse Signal Generation

Again, the cancellation pulse signal $g_c$ as discussed herein may be configured based on the configuration of the input signal x. As noted above with respect to FIGS. 6A and 6B, the cancellation pulse signal $g_c$ is then multiplied by the computed gain factors in the time domain to provide a scaled cancellation pulse signal. This scaled cancellation pulse signal is subtracted from the input data signal x in the time domain to provide the transmit signal y, which represents the input signal x after the CFR operations have been performed to eliminate or at least reduce the peak samples and to achieve a target PAPR.

The cancellation pulse signal $g_c$ as discussed herein may be generated in various ways and have different sample sizes, referred to herein as a length or sample length, depending upon the particular application. As discussed above, the scaled cancellation pulse signal (which may also be referred to herein simply as a scaled cancellation pulse) may be generated by multiplying the final gain factors by the cancellation pulse signal $g_c$ (for the process flow 600) or the stored sets of the cancellation pulse signals in a phase matching manner (for process flow 650). Again, the cancellation pulse $g_c$ may be generated based upon the transmission scheme of the input signal x, which may include a number of carrier signals at different frequencies and having respective bandwidths, a spectral location of each carrier, etc. The cancellation pulse $g_c$ may be designed with respect to each of the channelized transmit paths as discussed herein with respect to FIG. 5.

That is, the cancellation pulse $g_c$ may be generated as a set of samples in the time domain such that the spectral response (measured as the power spectral density (PSD)) of the cancellation pulse signal in the frequency domain matches that of the signal to be transmitted. In the illustrative scenario as used herein with respect to the FIGS. 9A, 9B, 10A, 10B, and 11A-11D, the signal to be transmitted comprises a composite, multi-carrier signal, each carrier having a bandwidth of 50 MHz, which is intended to comply with the requirements of the 3GPP new radio (NR) communication standard, the most recent at the time of this writing being Release 17, approved in December 2019. Again, it is noted that the techniques disclosed herein are not limited to a specific communication standard, and instead may operate in accordance with any suitable communication standard, specification, and/or protocol.

Figure 9A:
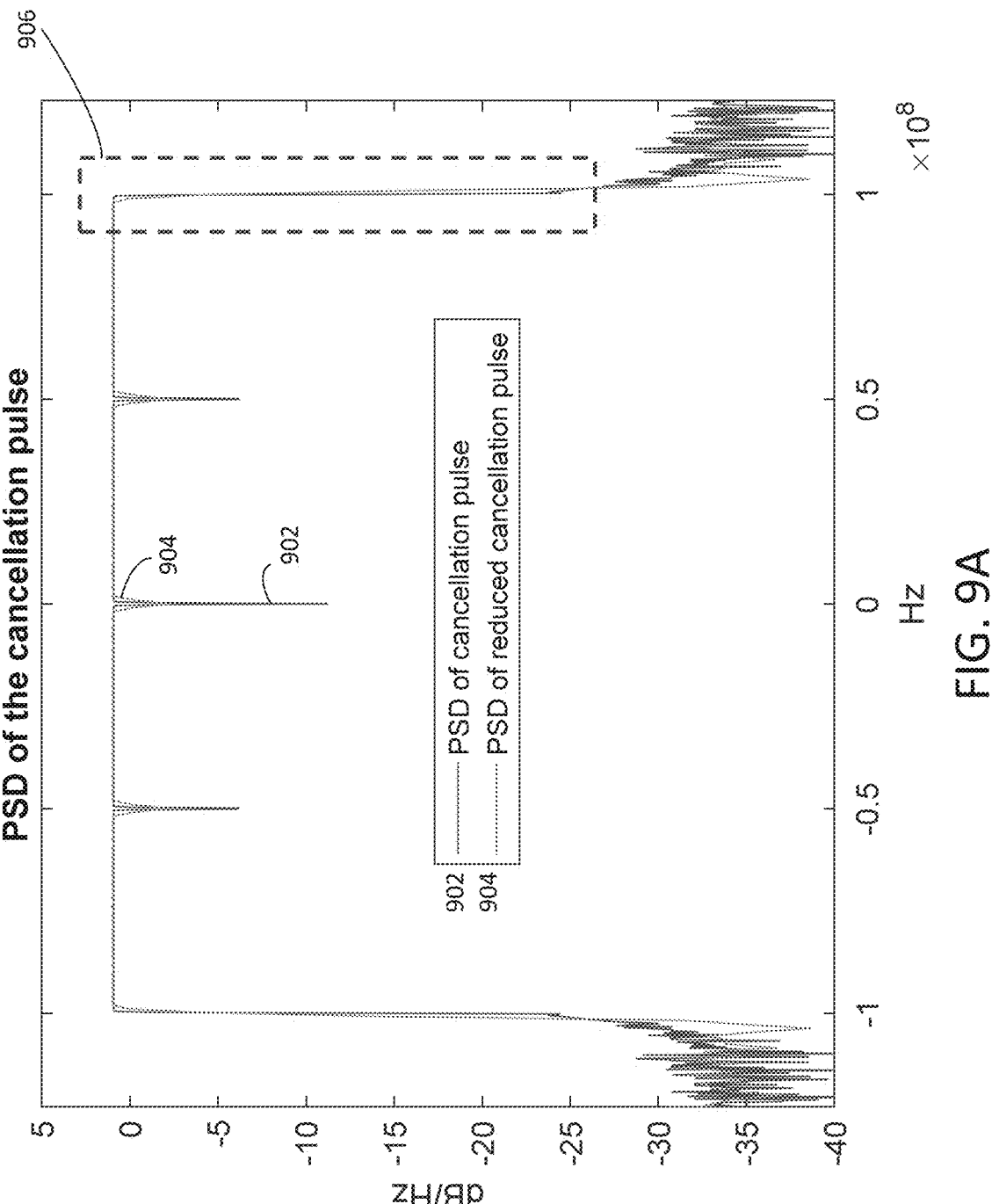
FIGS. 9A-9B illustrate a comparison between the PSD of a conventional and a reduced length cancellation pulse signal, in accordance with the disclosure.
Figure 10A:
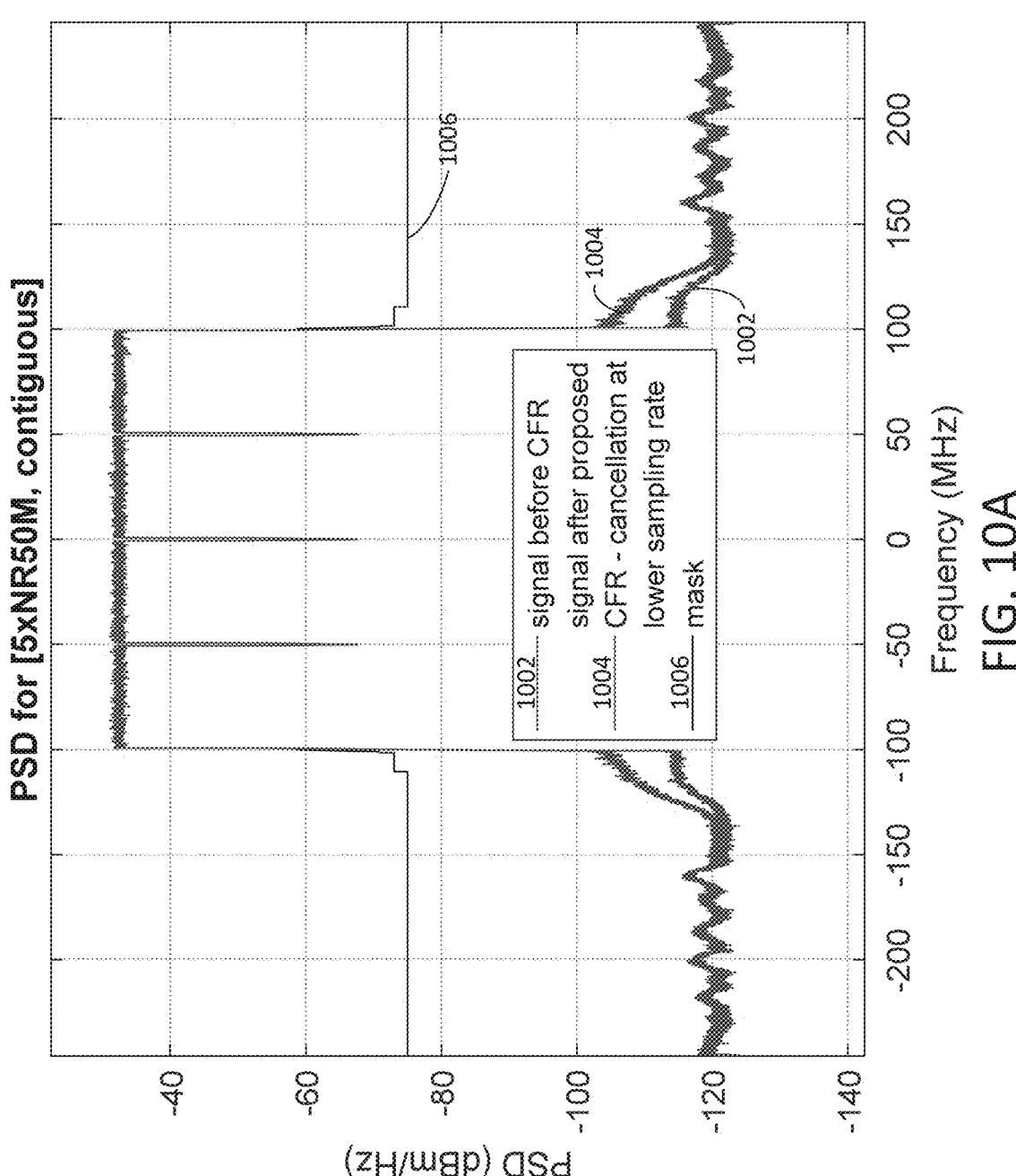
FIGS. 10A-10B illustrate a spectral response of a signal before and after the application of CFR operations using a conventional length cancellation pulse, in accordance with the disclosure.

Thus, for an input signal to be transmitted including 4, 50 MHz bandwidth carrier signals as shown in FIG. 10A, the spectral response of the cancellation pulse signal $g_c$ also tracks the spectral response of the signal in the frequency domain, as shown in FIG. 9A. Conventionally, a cancellation pulse is generated using the properties of the transmit chain 500 as discussed herein with respect to FIG. 5. To do so, a calibration or test procedure is carried out offline, i.e. prior to the operation of the wireless device in which the transmit chain 500 is implemented. This procedure involves the generation of an impulse signal, which is then provided by the data source 502 to each of the channelized transmit paths. This impulse signal may constitute a single non-zero magnitude sample within a larger number of a samples having a zero magnitude, which form a long sample "train" such as 10,000 samples, 100,000 samples, etc.

Then, the finite impulse response (FIR) of each channelized transmit path is measured by analyzing the impulse response of the signal sent through each channelized transmit path, which has been filtered, upsampled, modulated, and then finally combined via the signal combining block 518. Thus, the cancellation pulse signal is conventionally generated with a spectral response that matches the spectral response of the input signal, which is represented in FIG. 9A as the trace 902. The resulting cancellation pulse signal (such as the cancellation pulse signal $g_c$) comprises a number of data samples in the time domain and corresponds to the combination of the signal response of each composite carrier of the input signal after passing through each respective each channelized transmit path. Again, this cancellation pulse may then be scaled to provide the final cancellation pulse signal, which is then subtracted from the input signal as part of the CFR operations, as discussed above.

The cancellation pulse signal $g_c$ is thus generated conventionally by using the same taps as the channel filtering blocks 512A, 512B, 512C, and thus the cancellation pulse signal $g_c$ in the time domain has a sample length (i.e. a number of samples) equal to the highest number of taps among the channel filtering blocks 512A, 512B, 512C. To provide an illustrative example, if a signal to be transmitted has a single carrier signal that is transmitted via the 'A' channelized transmit path, then the corresponding cancellation pulse would conventionally have a sample length equal to that of the number of taps of the channel filtering block 512A. To provide another illustrative and non-limiting example, for a signal to be transmitted having three carrier signals, then the scaled cancellation pulse signal would comprise a number of data samples equal to the highest number of filter taps from among the channel filtering blocks 512A, 512B, 512C.

Figures 8D, 8E:
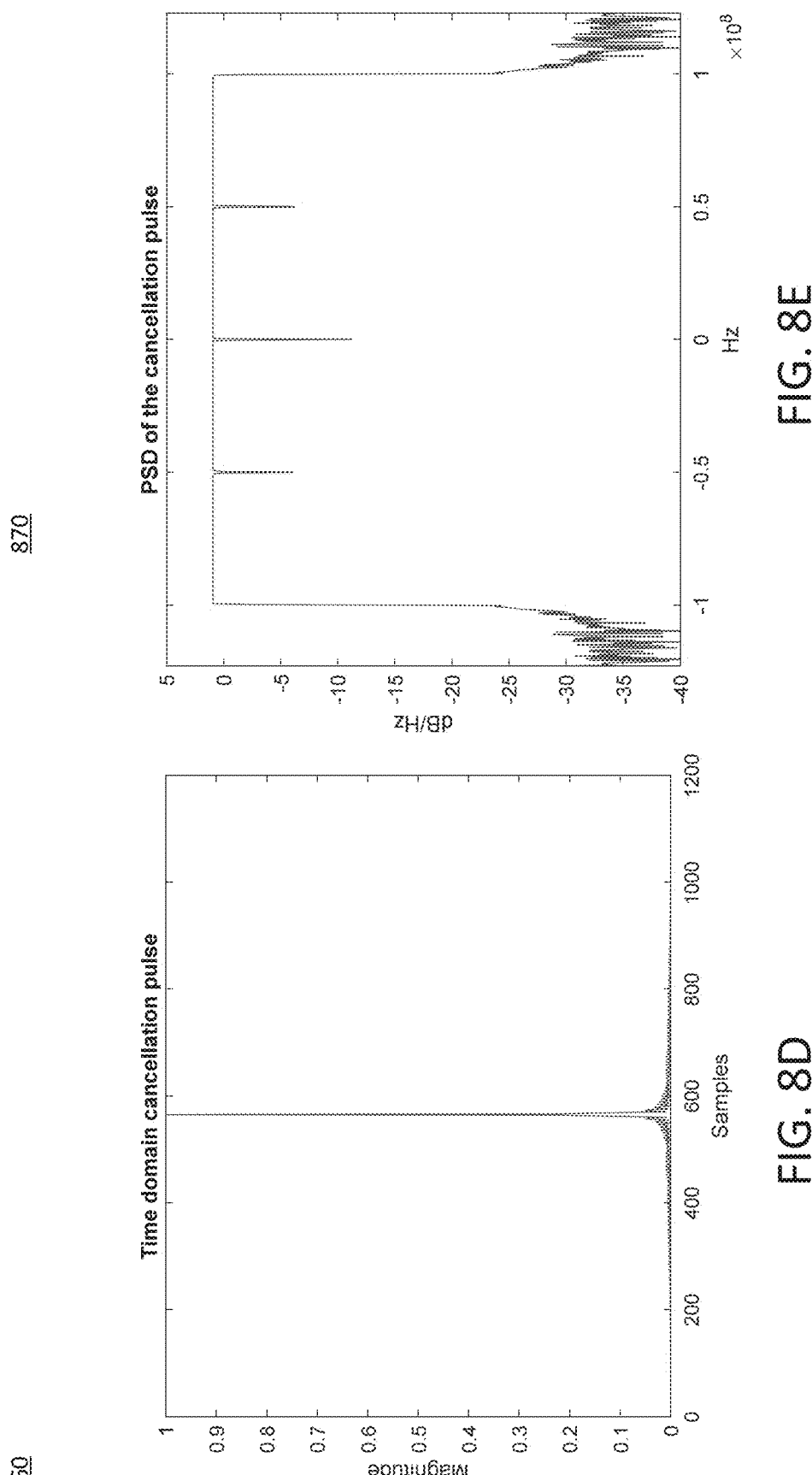
FIG. 8D illustrates another cancellation pulse in the time domain, in accordance with the disclosure.
FIG. 8E illustrates a power spectral density (PSD) of the cancellation pulse as shown in FIG. 8D, in accordance with the disclosure.

A non-limiting and illustrative scenario of such a cancellation pulse signal is shown in FIGS. 8D-8E, with FIG. 8D illustrating the cancellation pulse signal in the time domain and FIG. 8E illustrating the PSD of the cancellation pulse signal in the frequency domain. The cancellation pulse signal as shown in FIGS. 8D-8E may be identified with the cancellation pulse signal 902 as shown in FIGS. 9A-9B, which again corresponds to a composite signal to be transmitted. Thus, the cancellation pulse signal as shown in FIGS. 8D and 8E represents a "full length" (i.e. not reduced in length) cancellation pulse signal that is generated utilizing the filter taps of the channel filtering blocks 512. In an illustrative and non-limiting scenario, the cancellation pulse signal in the time domain as shown in FIG. 8D has a sample length of 1128 samples, although this is for ease of explanation and the cancellation pulse signal may have any suitable length based upon the number of filter taps used in the system, as noted above.

However, in accordance with the disclosure, it is recognized that regulatory requirements may still be met with respect to data transmissions by reducing the sample length of the cancellation pulse signal to less than the number of channel filter taps associated with the largest channel filter in the transmit chain. And because the scaled cancellation signal is computed by multiplying the cancellation pulse signal by respective gain factors, a reduction in the sample length of the cancellation pulse signal in this manner significantly reduces processing power and resources. Therefore, the reduced length cancellation pulse signal as discussed herein may comprise a number of data samples, and corresponds to a simulated FIR response in the time domain of the input signal after being filtered, upsampled, modulated, and combined with the other carriers (when present) via the channel processing circuitry 520.

Figures 8F, 8G:
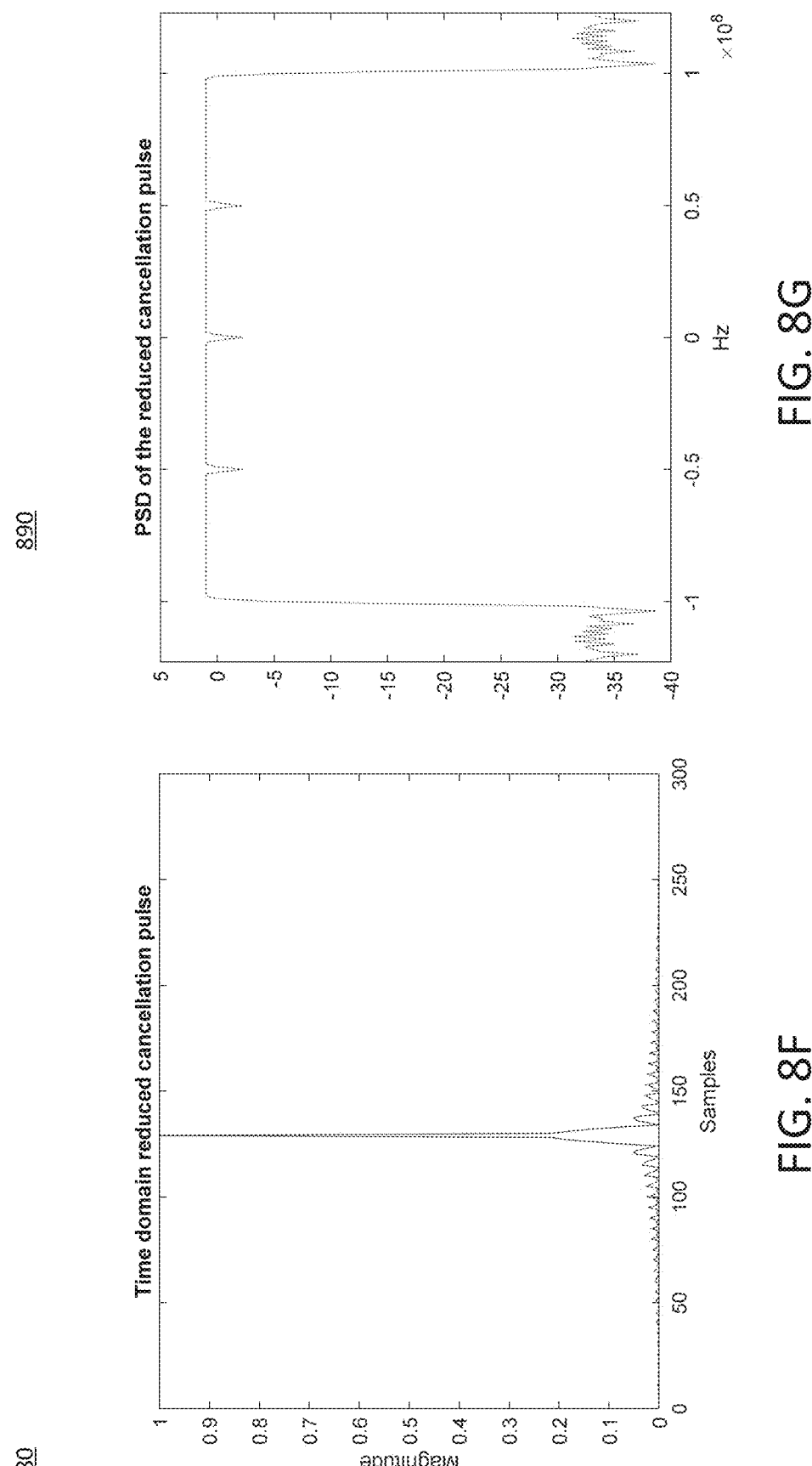
FIG. 8F illustrates a reduced length cancellation pulse in the time domain, in accordance with the disclosure.
FIG. 8G illustrates a power spectral density (PSD) of the reduced length cancellation pulse as shown in FIG. 8F, in accordance with the disclosure.
Figure 9B:
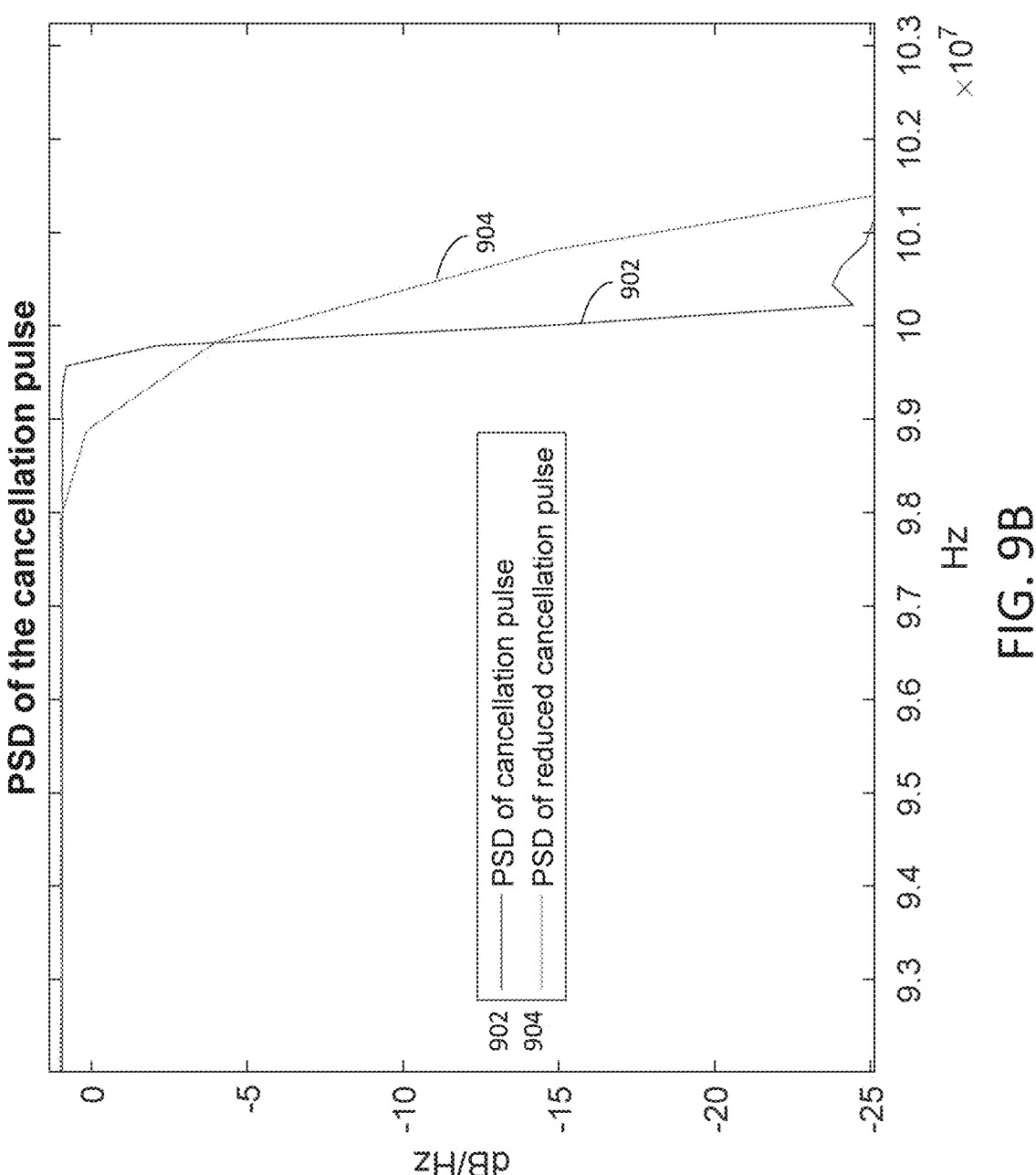

A non-limiting and illustrative scenario of a reduced length cancellation pulse signal is shown in FIGS. 8F and 8G, with FIG. 8F illustrating the reduced length cancellation pulse signal in the time domain and FIG. 8G illustrating the PSD of the reduced length cancellation pulse signal in the frequency domain. The cancellation pulse signal as shown in FIGS. 8F and 8G is identified with the cancellation pulse signal 904 as shown in FIGS. 9A-9B. Thus, the cancellation pulse signal as shown in FIGS. 8F and 8G represents a "reduced length" cancellation pulse signal that is generated via a simulated filter operation, as discussed in further detail herein. In an illustrative and non-limiting scenario, the reduced length cancellation pulse signal in the time domain as shown in FIG. 8F has a sample length of 256 samples versus the sample length of 1128 samples for the cancellation pulse signal as shown in FIGS. 8D and 8E, although this is for ease of explanation and the reduced length cancellation pulse signal may have any suitable length based upon an acceptable tradeoff between meeting regulatory requirements while still reducing complexity and processing power required by the CFR algorithm.

Therefore, to generate the reduced length cancellation pulse signal in accordance with the disclosure, the cancellation pulse signal is generated in a synthesized manner versus using the actual filter configuration and taps of each channel filtering block 512 as shown in FIG. 5. This is accomplished by simulating the filter parameters of each channel filtering block 512 to deviate from those implemented by the channel filtering blocks 512. In other words, the cancellation pulse signal $g_c$ may be generated having a reduced length by simulating the filter responses of the channel filtering blocks 512 depending upon the configuration of the signal to be transmitted. To provide some illustrative and non-limiting scenarios, filter parameters may be modified such as simulating a wider bandwidth than the respective channel filtering blocks 512, defining a stop band that is slightly outside the edge of the carrier signals (by 0.05%, 0.1%, 1%, etc.), etc. Any suitable combination of the filter parameters may be modified in this manner to achieve a desired balance between the length of the cancellation pulse signal $g_c$ to reduce processing power while meeting regulatory requirements such as ACLR, other suitable emissions requirements, etc.

Thus, and as shown in FIGS. 9A and 9B, the PSD of the cancellation pulse signal 902 and a reduced length cancellation pulse signal 904 are illustrated for a composite signal comprising four, 50 MHz carrier signals. The reduced length cancellation pulse signal 904 as shown in FIGS. 9A-9B in the frequency domain is thus identified with a composite signal comprising four carrier signals, and is identified with the signal to be transmitted. However, in accordance with the disclosure, the reduced length cancellation pulse signal may be generated in accordance with the configuration of the transmit signal, which may comprise any suitable number of carrier signals.

Again, the conventional use of such a cancellation pulse signal, which is generated using the taps of each respective channel filter identified with each carrier, the largest being 1128 taps in this scenario, is represented in trace 902. However, the trace 904 corresponds to the PSD of the synthetically-generated cancellation pulse signal, which corresponds to a simulated filter response and has, in the time domain, a number of samples less than the number of taps of the channel filter with the largest number of taps. Again, the length of the reduced length cancellation pulse signal is 256 samples in this illustrative and non-limiting scenario, as shown in FIG. 8F. Thus, the cancellation pulse in the time domain would have a sample length of 256 samples versus 1128 samples, as would the scaled cancellation pulse signal that is subtracted from the input signal x as part of the CFR operations as discussed herein.

As shown in FIG. 9B, which provides a detailed view of the spectral edges of the cancellation pulse signals identified with the box 906 in FIG. 9A, the use of the simulated filter parameters that deviate from those implemented via the channel filtering blocks 512 results in a spectral response of the reduced length cancellation pulse signal that also deviates from the spectral response of the signal to be transmitted. This also results in the reduction of the number of samples in the cancellation pulse, and is an acceptable tradeoff to reduce the complexity of the CFR algorithm while still meeting regulatory requirements with respect to signal transmissions.

In the case in which a single carrier signal is transmitted, then the number of data samples in the cancellation pulse signal $g_c$ is less than the number of taps associated with the channel filter identified with that carrier signal. In the case in which a signal to be transmitted comprises a composite signal having multiple carrier signals, then the cancellation pulse signal may comprise a number of data samples that are less than the number of taps identified with channel filtering blocks 512 having the largest number of taps.

Again, it is noted that a conventional cancellation pulse signal is generated using the taps of the channel filtering blocks 512, and thus a conventional cancellation pulse signal has a spectral response that is identical to (or significantly corresponds to) that of the signal to be transmitted. However, due to the synthetic generation of the cancellation pulse signal in accordance with the disclosure, the spectral response of the cancellation pulse signal and that of the signal to be transmitted may deviate from one another, which again is a result of the modification of the various simulated filter parameters used.

As shown in FIG. 9B, this deviation may be with respect to the edges of the spectral response of the signal to be transmitted and the cancellation pulse signal. Thus, the spectral response of the signal to be transmitted may be identical to the spectral response of the cancellation pulse signal except at its spectral edges. As shown in the illustrative and non-limiting scenario of FIG. 9B, the spectral response of the signal to be transmitted is identical to the spectral response of the cancellation pulse signal 902, with the spectral response of the reduced length cancellation pulse 904 deviating from the signal to be transmitted at the edge of the signal to be transmitted. The term "edge" in this context may refer to any suitable proportion of bandwidth of the signal to be transmitted, outside of which (i.e. as a "frequency edge") the spectral response of the reduced length cancellation pulse signal falls off or otherwise deviates from the spectral response of the signal to be transmitted in this manner, such as outside of 90% of the signal bandwidth, 95%, 99%, 99.5%, etc.

Again, the design of the reduced length cancellation pulse signal represented as trace 904 in FIGS. 9A and 9B is provided as an illustrative and non-limiting scenario. Although the reduced length cancellation pulse signal is shown in FIGS. 9A and 9B as deviating from the spectral response of the signal to be transmitted at the frequency edge of approximately 100 MHz, in other scenarios a larger portion of the spectral response of the reduced length cancellation pulse signal may be contained within the bandwidth of the carrier signal to be transmitted. That is, the cancellation pulse signal as shown in the trace 904 reaches a magnitude of −3 dB at approximately 100 MHz, and is then outside of the bandwidth defined by the spectral response of the signal to be transmitted (i.e. 100 MHz). The reduced length cancellation pulse signal may alternatively be configured to be contained within the bandwidth of the carrier signal. In this context, "contained" means that the spectral response of the reduced length cancellation pulse signal may "fall off" to have a minimum magnitude value within the bandwidth of the carrier signal to be transmitted that corresponds to any suitable magnitude threshold value such as −3 dB, −10 dB, −20 dB, etc. Thus, the spectral response of the reduced length cancellation pulse signal may be considered to be contained within the bandwidth of the carrier signal when the spectral response of the reduced length cancellation pulse signal crosses the frequency band edge (the 100 MHz frequency in the scenario as shown in FIG. 9B) at a predetermined threshold magnitude value such as −6 dB, −10 dB, −20 dB, etc., in contrast to the approximate magnitude of −3 dB as shown in FIG. 9B.

In this way, the reduced length cancellation pulse signal may be designed optimally to have a reduced sample length that reduces the complexity of the CFR algorithm while still meeting the appropriate regulatory requirements. The length of the reduced length cancellation pulse signal may be selected as a recognized trade-off between the out-of-band radiation and in-band distortion. Moreover, the reduced length cancellation pulse signal should result in compliance with regulatory spectral mask requirements, such as those defined in 3GPP specifications, or any other suitable regulatory specifications.

The reduced cancellation pulse signal as shown in FIGS. 9A-9B thus represents a spectral response of the reduced length cancellation pulse signal, which is represented as a number of data samples in the time domain to perform the CFR operations as noted herein. This reduced cancellation pulse signal may be multiplied by a set of gain factors to generate a scaled cancellation pulse that is then subtracted from a set of samples identified with the delayed version of the input signal, as noted above, to generate the transmit signal.

The reduced length cancellation pulse as described herein may be implemented in accordance with any suitable CFR techniques, including known techniques, to perform peak sample cancellation and to generate the transmit signal. Thus, in one illustrative and non-limiting scenario, the reduced length cancellation pulse signal may be implemented as part of the process flows 600, 650, as discussed herein with respect to FIGS. 6A and 6B. To do so, the reduced length cancellation pulse signal may be used as the cancellation pulse signal $g_c$ as shown in FIG. 6B. Thus, the CFR operations as discussed herein with reference to the process flows 600 and 650 may still be implemented in the same manner by using the cancellation pulse signal $g_c$ having a reduced length.

Alternatively, the reduced length cancellation pulse signal $g_c$ may be implemented as part of a conventional, multiple-iteration CFR algorithm as discussed herein with respect to FIG. 4. This may be particularly useful as multiple iterations are needed, and the reduced length cancellation pulse signal reduces the number of multiplicative operations needed to generate the scaled cancellation pulse signal in each sample peak cancelling iteration.

In any event, the use of the reduced length cancellation pulse signal does not result in a change in EVM compared to the use of a conventional length cancellation pulse signal, although the reduced length cancellation pulse signal may slightly degrade the ACLR. Nonetheless, the reduced length cancellation pulse signal may be designed having a sample length that still allows regulatory requirements to be met albeit with a slight increase to the ACLR. This is discussed in further detail below with respect to FIGS. 10A-10B and 11A-11D.

Figure 10B:
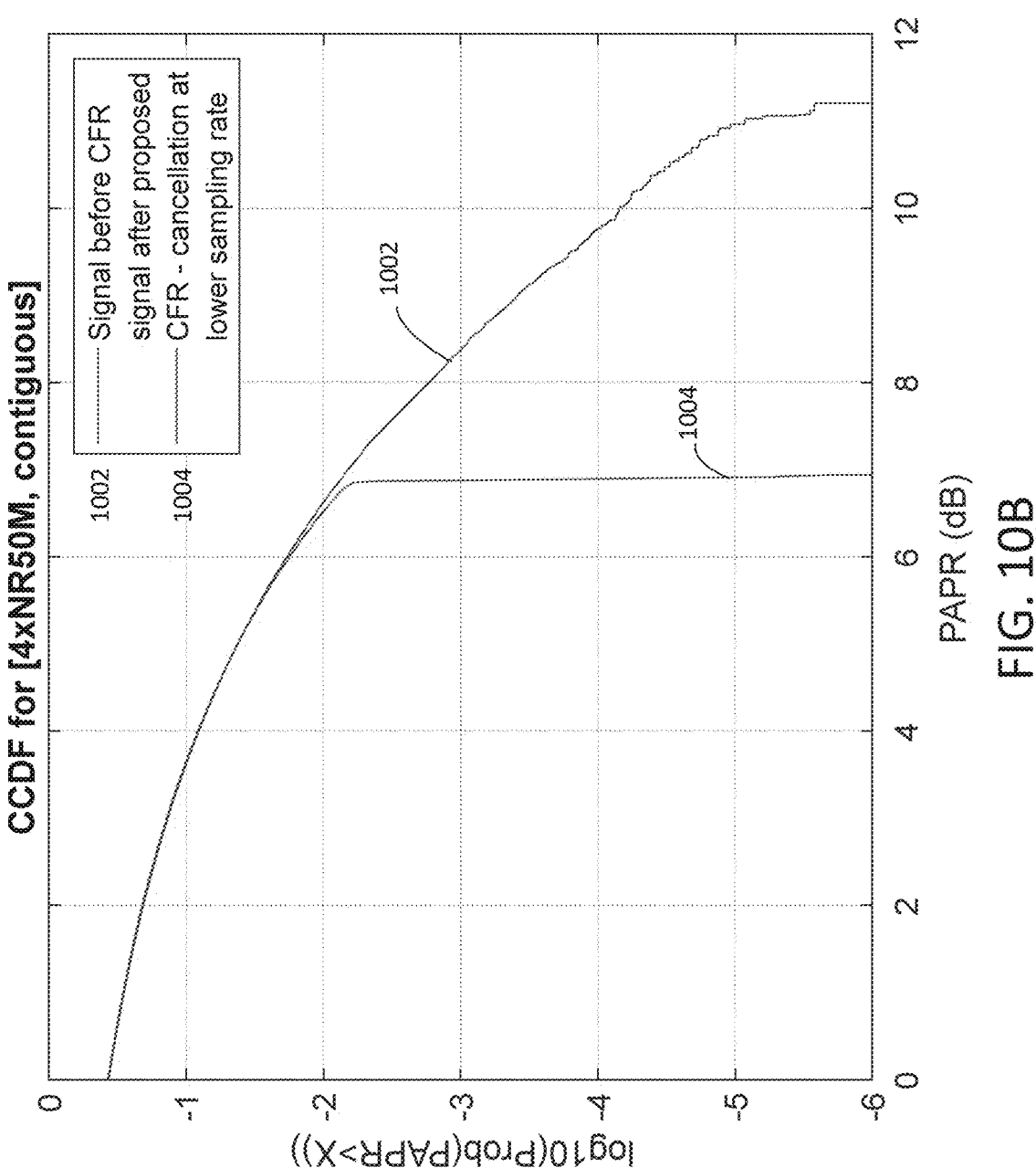

FIGS. 10A-10B illustrate a spectral response of a signal before and after the application of CFR operations using a conventional length cancellation pulse, in accordance with the disclosure. Thus, in the illustrative and non-limiting scenario as shown in FIGS. 10A and 10B, the trace 1002 corresponds to the spectral response of a signal prior to CFR operations being performed (such as the input signal x), whereas the trace 1004 corresponds to the spectral response of the transmit signal after CFR operations have been performed (such as the transmit signal y) to cancel the sample peaks as discussed herein. FIG. 10B illustrates additional detail of each of these signals. The regulatory mask 1006 is an emissions requirement defined in the 3GPP NR standard, which represents a mathematically-defined set of lines applied to the levels of radio transmissions. Thus, FIGS. 10A and 10B illustrate compliance with the mask requirement, both prior to and after the CFR operations are performed. It is noted that the lower sampling rate CFR operations as discussed herein with respect to the process flow 650 of FIG. 6A was implemented to generate the CFR in the illustrative scenarios as shown in each of the FIGS. 10A-10B and 11A-11D.

Figure 11A:
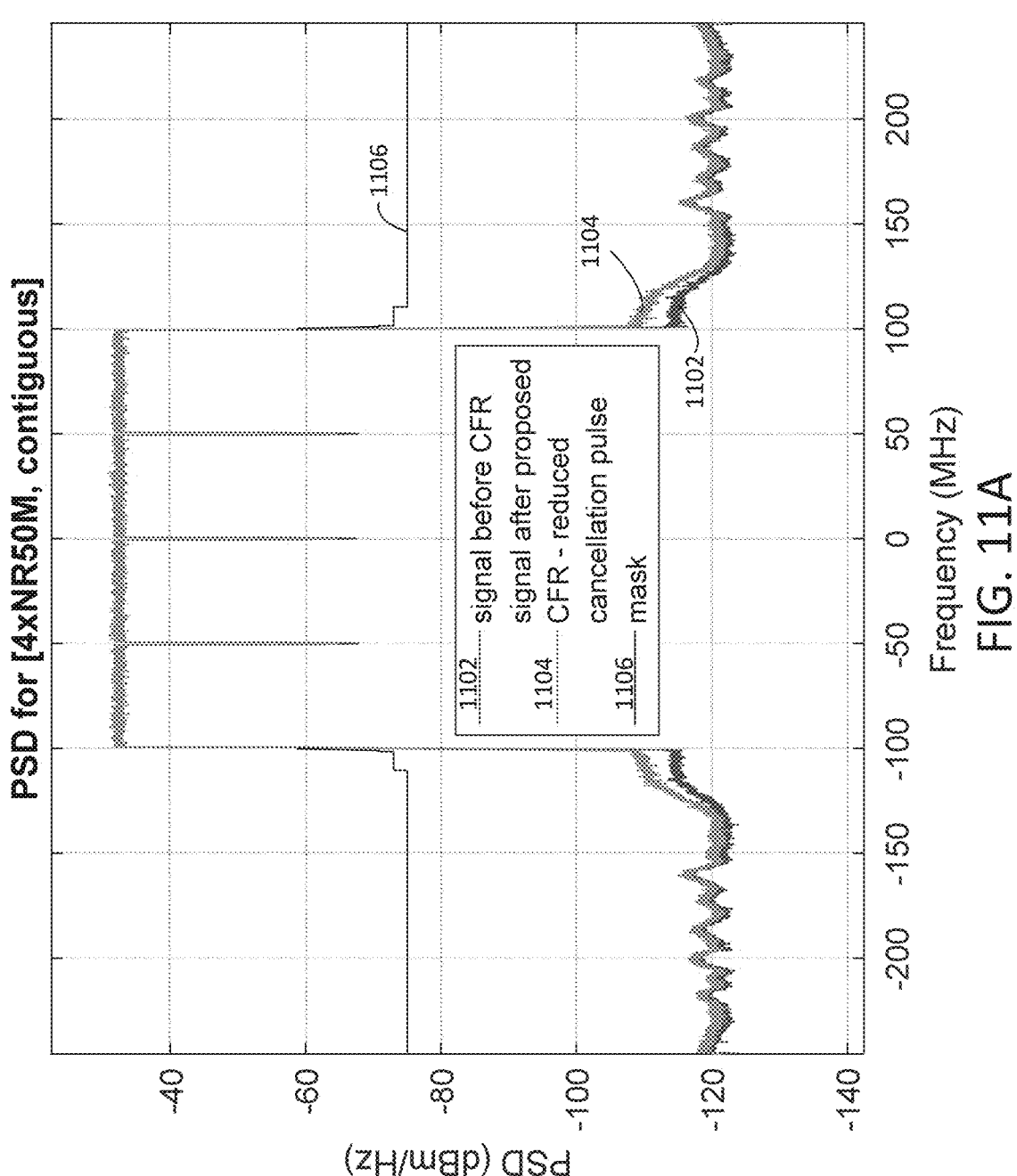
FIGS. 11A-11B illustrate a spectral response of a signal before and after the application of CFR operations using a reduced length cancellation pulse, in accordance with the disclosure.
Figure 11B:
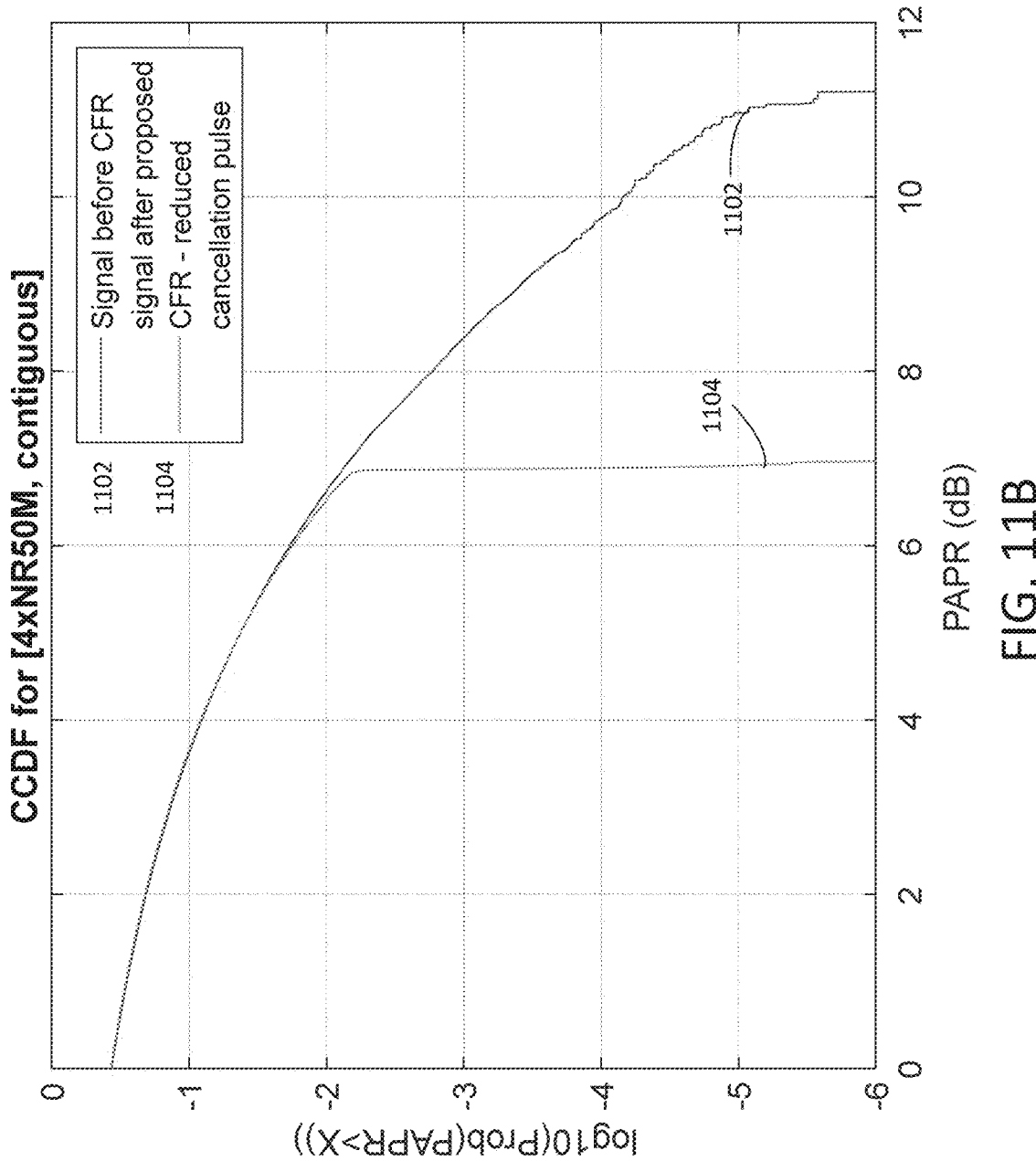

FIGS. 11A-11B illustrate a spectral response of a signal before and after the application of CFR operations using a reduced length cancellation pulse, in accordance with the disclosure. Thus, in the illustrative and non-limiting scenario as shown in FIGS. 11A and 11B, the trace 1102 corresponds to the spectral response of the input signal x prior to CFR operations being performed, as discussed with respect to FIGS. 10A-10B. The trace 1104 corresponds to the spectral response of the transmit signal y after CFR operations have been performed using the reduced length cancellation pulse signal to cancel the sample peaks as discussed herein. FIG. 11B illustrates additional detail of each of these signals. Compared with the trace 1004 as shown in FIG. 10B, the trace 1104 as shown in FIG. 11B illustrates that the use of the reduced length cancellation pulse still results in a transmit signal that complies with the spectral mask requirements. That is, the spectral response of the transmit signal (trace 1104) as shown in FIG. 11A complies with boundaries defined by the trace 1106, which is associated with the regulatory spectral mask.

Figure 11C:
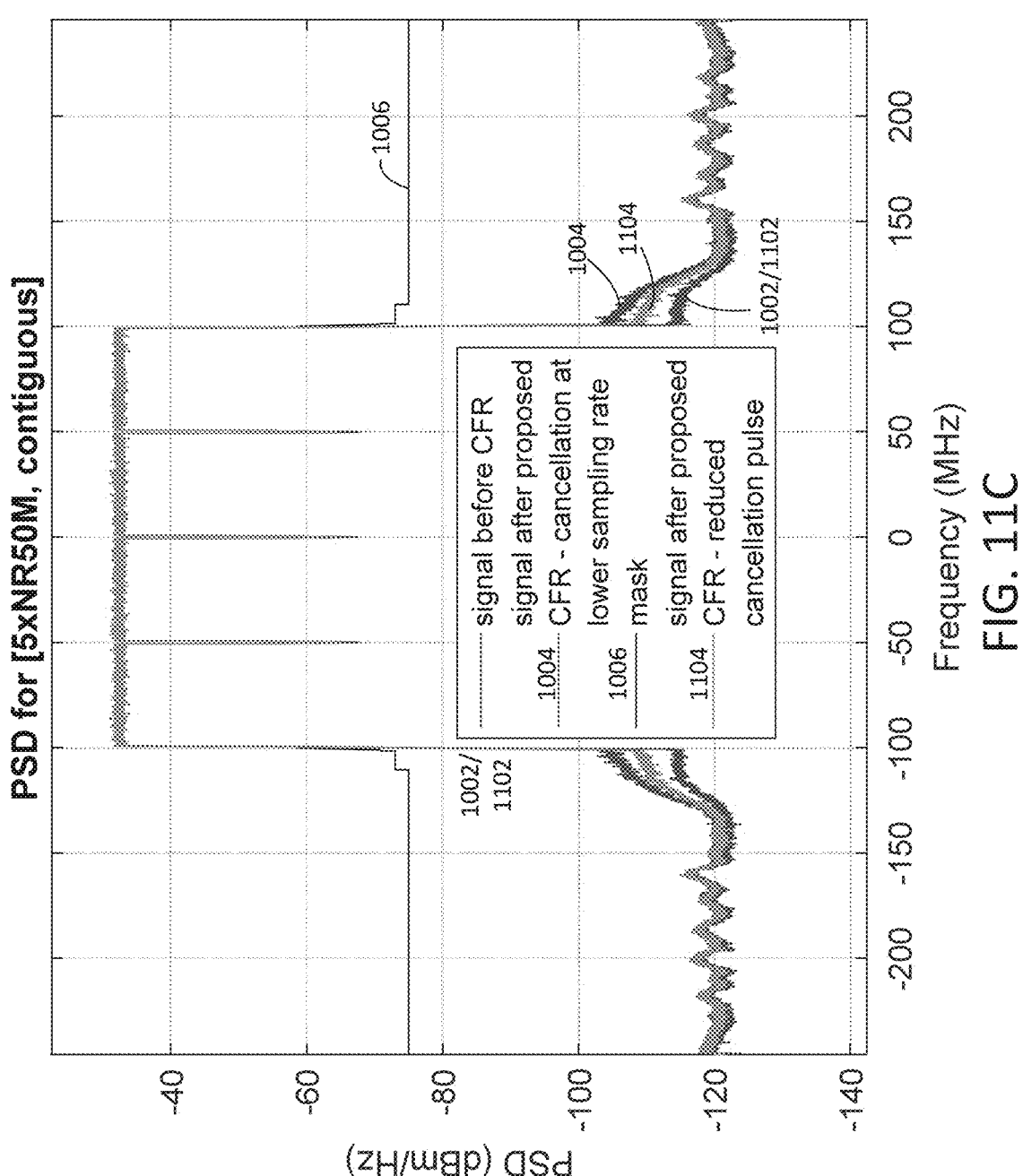
FIGS. 11C-11D illustrate a comparison of the spectral response of a signal before and after the application of CFR operations using a conventional length cancellation pulse and a reduced length cancellation pulse, in accordance with the disclosure.
Figure 11D:
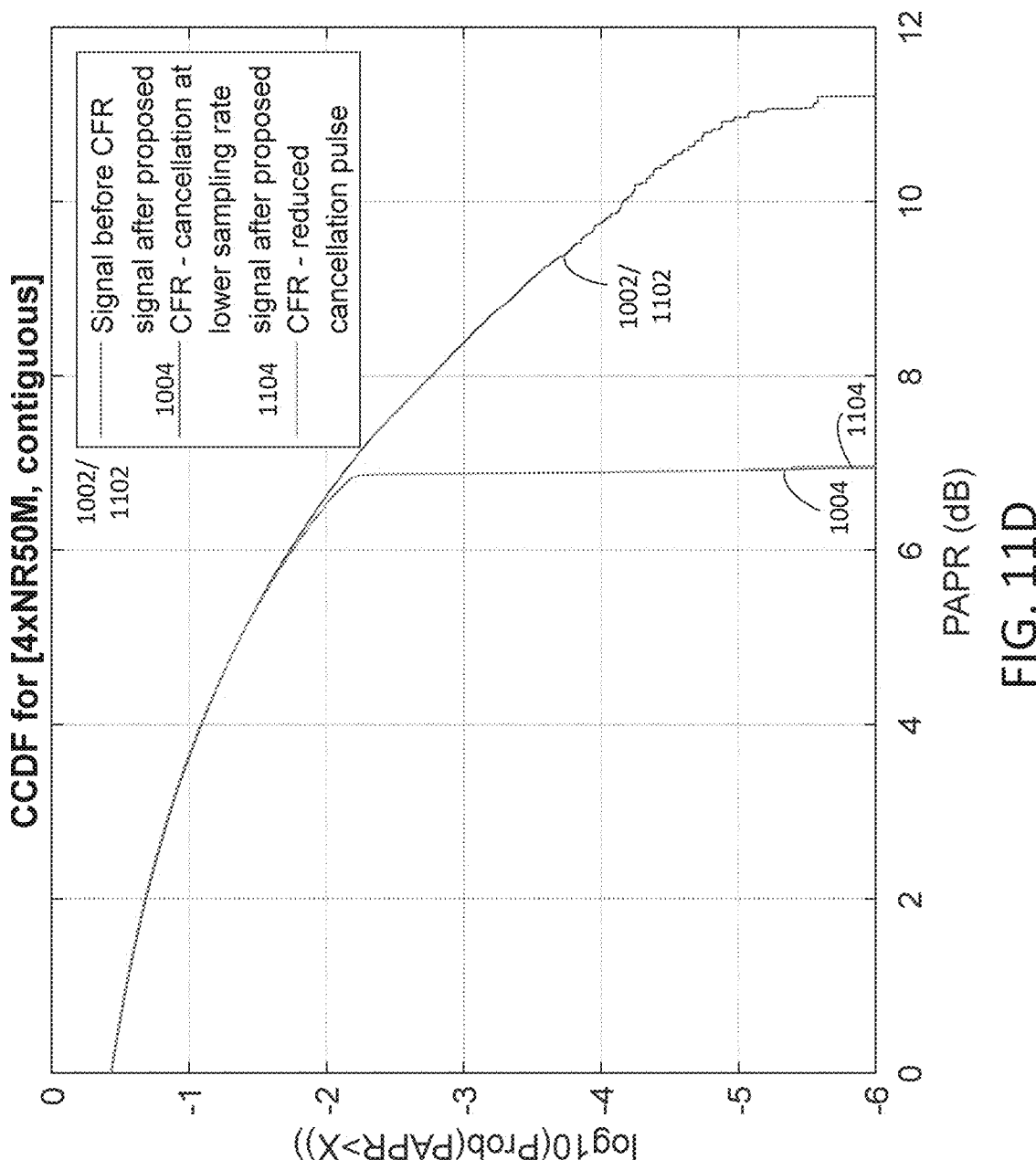

FIGS. 11C-11D illustrate a comparison of the spectral response of a signal before and after the application of CFR operations using a conventional length cancellation pulse and a reduced length cancellation pulse, in accordance with the disclosure. Thus, in the illustrative and non-limiting scenario as shown in FIGS. 11C and 11D, the trace 1002/1102 corresponds to the spectral response of the input signal x prior to CFR operations being performed, as discussed with respect to FIGS. 10A-10B and 11A-11B. The trace 1004 corresponds to the spectral response of the transmit signal y after CFR operations have been performed using the conventional length cancellation pulse signal to cancel the sample peaks as discussed herein with respect to FIGS. 10A-10B. The trace 1104 corresponds to the spectral response of the transmit signal y after CFR operations have been performed using the reduced length cancellation pulse signal to cancel the sample peaks as discussed herein with respect to FIGS. 11A-11B.

Compared with the trace 1004 as shown in FIG. 10B, the trace 1104 as shown in FIG. 11C illustrates that the use of the reduced length cancellation pulse still results in a transmit signal that complies with the spectral mask requirements. That is, the spectral response of the transmit signal (trace 1104) as shown in FIG. 11C complies with boundaries defined by the trace 1006, which is associated with the regulatory spectral mask. FIG. 11D illustrates additional detail of each of these signals.

Table 1 below further provides a comparison of the EVM, ACLR, and PAPR metrics using a conventional length and reduced length cancellation pulse signal to perform CFR operations. Again, the CFR operations used for this non-limiting and illustrative scenario corresponds to the comparison as shown in FIGS. 11C-11D, and is generated by implementing the lower sampling rate CFR identified with the process flow 650, as discussed herein with respect to FIG. 6B.

TABLE 1

| | CFR - Conventional Length Cancellation Pulse Signal | CFR - Reduced Length Cancellation Pulse Signal |
|---|---|---|
| EVM | 3.75% | 3.75% |
| ACLR | 72 dB | 76 dB |
| PAPR | 6.9 dB @ $10^{-4}$ | 6.9 dB @ $10^{-4}$ |

As shown in Table 1 above, the CFR algorithm identified with the lower sampling rate provides an output signal in each case that meets or exceeds the performance of the conventional CFR algorithm. It is noted that the use of the reduced length cancellation pulse signal results in an ACLR increase from 72 dB to 76 dB, which is still within the threshold of regulatory requirements.

Table 2 below summarizes a comparison between using a conventional length and a reduced length cancellation pulse signal to perform CFR operations. Again, the CFR operations used for this non-limiting and illustrative scenario corresponds to the comparison as shown in FIGS. 11C-11D, and is generated by implementing the lower sampling rate CFR identified with the process flow 650, as discussed herein with respect to FIG. 6B.

Table 2 below provides illustrative parameters used in each case to allow for an accurate comparison between the use of the conventional and reduced length cancellation pulses to achieve a target PAPR of 7 dB. For this illustrative scenario, $g_c$ represents the conventional cancellation pulse length, g represents the upsampled cancellation pulse length, g' represents the truncated upsampled cancellation pulse length, $L_b$ represents the block length of the input signal x, $N_p$ represents the maximum number of peaks in a block, $N_c$ represents the maximum number of cluster peaks in a block, $N_{gi}$ represents the maximum number of gain iterations in a block of samples, and $N_{pc}$ represents the maximum number of peaks canceled in a block of samples. Table 2 illustrates the complexity, measured in Mega cycles per second (MCPS) for each of the CFR algorithms operating under the same signal conditions and using either the conventional length or the reduced length cancellation pulse to perform the CFR operations. The use of the reduced length cancellation pulse signal shows a significant complexity reduction compared to the conventional length cancellation pulse signal while providing equal performance.

TABLE 2

| 4 NR 500 MHz carriers (NR-FR1-TM3.1, 64 QAM) | | |
|---|---|---|
| | Parameters | Complexity (MCPS) |
| CFR - Conventional Length Cancellation Pulse Signal | $g_c = 1128$, g = 2256, g' = 60, $N_p = 56$, $N_c = 32$, $N_{gi} = 19$, $N_{pc} = 40$, $L_b = 2048$, PAPR = 7 dB | 516 |
| CFR - Reduced Length Cancellation Pulse Signal | $g_c = 256$, g = 512, g' = 60, $N_p = 56$, $N_c = 32$, $N_{gi} = 19$, $N_{pc} = 40$, $L_b = 2048$, PAPR = 7 dB | 359 |

Figure 12:
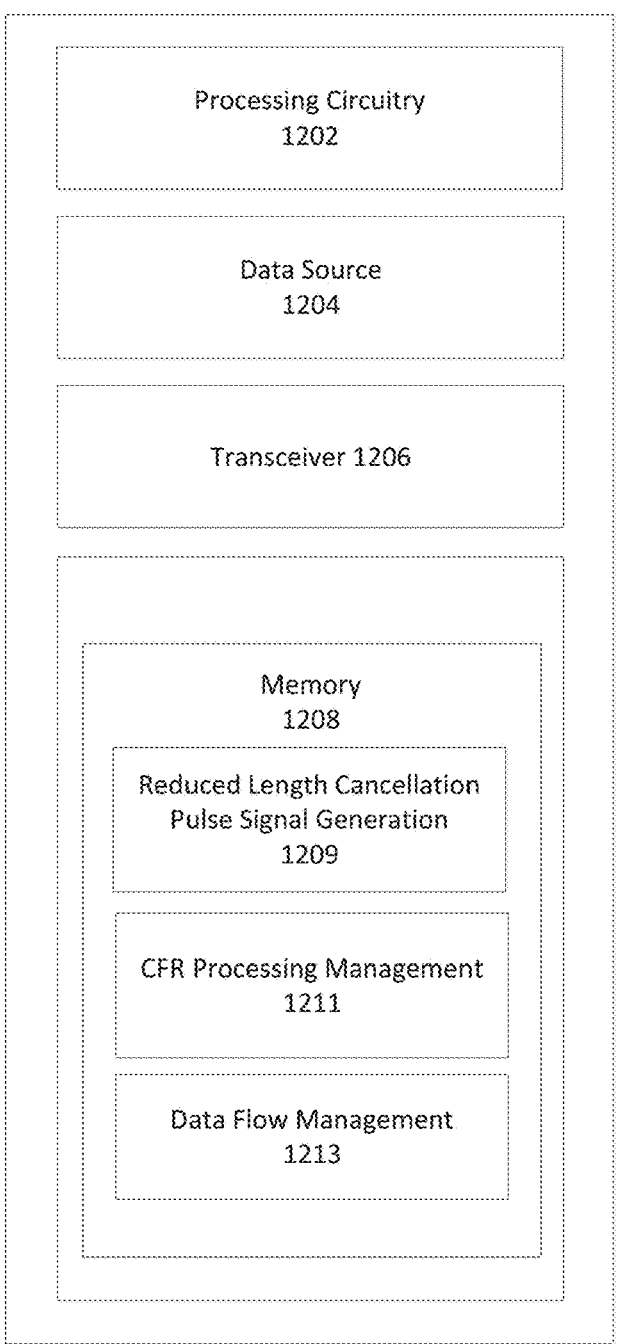
FIG. 12 illustrates a device.

FIG. 12 illustrates a device, in accordance with the disclosure. The device 1200 may be identified with one or more devices implementing transmitter circuitry, such as the transmit chain 500 as shown and discussed herein with reference to FIG. 5. The device 1200 may be identified with a wireless communications base station, wireless device, a user equipment (UE) or other suitable device configured to perform wireless communications such as a mobile phone, a laptop computer, a tablet, etc. The device 1200 may include one or more components configured to transmit and receive radio signals and to use the CFR operations as discussed herein in accordance with wirelessly transmitted data.

As further discussed below, the device 1200 may perform the CFR operations as discussed herein with respect to the transmit chain 500 as shown in FIG. 5 and discussed with respect to the process flows 600, 650 as shown and FIGS. 6A-6B. To do so, the device 1200 may include processing circuitry 1202, a data source 1204, a transceiver 1206, and a memory 1208. The components shown in FIG. 12 are provided for ease of explanation, and the device 1200 may implement additional, less, or alternative components as those shown in FIG. 12.

The processing circuitry 1202 may be configured as any suitable number and/or type of processing circuitry and/or computer processors, which may function to control the device 1200 and/or other components of the device 1200. The processing circuitry 1202 may be identified with one or more processors (or suitable portions thereof) implemented by the device 1200 or a host system. The processing circuitry 1202 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc. The processing circuitry 1202 may be identified with the programmable processing array portion 300 as shown and discussed herein with reference to FIG. 3, and may facilitate performing the CFR operations in accordance with a processing array architecture.

In any event, the processing circuitry 1202 may be configured to carry out instructions to perform arithmetical, logical, and/or input/output (I/O) operations (such as the aforementioned CFR operations), and/or to control the operation of one or more components of device 1200 to perform various functions as described herein. The processing circuitry 1202 may include one or more microprocessor cores, memory registers, buffers, clocks, etc., and may generate electronic control signals associated with the components of the device 1200 to control and/or modify the operation of these components. The processing circuitry 1202 may communicate with and/or control functions associated with the data source 1204, the transceiver 1206, and/or the memory 1208.

The data source 1204 may be implemented as any suitable type of data source to facilitate the transmission and reception of data in accordance with any suitable data rate and/or communication protocol. The data source 1204 may comprise a data modem or any other suitable components configured to send and receive data such as IQ data in a digital form, which may include the digital data streams as discussed herein.

The transceiver 1206 may include a digital RF front end comprising any suitable type of components to facilitate the transmission and option reception of wireless signals, including components associated with known transceiver, transmitter, and/or receiver operation, configurations, and implementations. The transceiver 1206 may be identified with one or more portions of the transmit chain 500, such as the channel processing circuitry 520, and include any suitable number of transmitters, receivers, or combinations of these that may be integrated into a single transceiver or as multiple transceivers or transceiver modules. The transceiver 1206 may include components typically identified with an RF front end and include antennas, ports, power amplifiers (PAs), RF filters, mixers, local oscillators (LOs), low noise amplifiers (LNAs), upconverters, downconverters, channel tuners, analog-to-digital converters (ADCs), digital to analog converters (DACs), intermediate frequency (IF) amplifiers and/or filters, modulators, demodulators, baseband processors, etc. Thus, the transceiver 1206 may be configured as any suitable number and/or type of components configured to facilitate receiving and/or transmitting data and/or signals in accordance with any suitable number and/or type of wireless communication protocols.

The memory 1208 stores data and/or instructions such that, when the instructions are executed by the processing circuitry 1202, cause the device 1200 to perform various functions as described herein with respect to the transmit chain 500, such as the generation of a reduced length cancellation pulse signal, the execution of the various stages of the CFR operations discussed herein with respect to the process flow 650, etc. The memory 1208 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 1208 may be non-removable, removable, or a combination of both. The memory 1208 may be implemented as a non-transitory computer readable medium storing one or more executable instructions such as, for example, logic, algorithms, code, etc.

As further discussed below, the instructions, logic, code, etc., stored in the memory 1208 are represented by the various modules as shown, which may enable the functionality disclosed herein to be functionally realized. Alternatively, the modules as shown in FIG. 12 that are associated with the memory 1208 may include instructions and/or code to facilitate control and/or monitor the operation of hardware components implemented via the device 1200. In other words, the modules shown in FIG. 12 are provided for ease of explanation regarding the functional association between hardware and software components. Thus, the processing circuitry 1202 may execute the instructions stored in these respective modules in conjunction with one or more hardware components to perform the various functions as discussed herein.

The executable instructions stored in the reduced length cancellation pulse signal generation module 1209 may facilitate, in conjunction with execution via the processing circuitry 1202, the device 1200 generating a synthesized reduced length cancellation pulse signal, as discussed herein. Again, this reduced length cancellation pulse signal may comprise a set of data samples based upon a simulated filter response that modifies the filter parameters of the channel filtering blocks 512. This number of data samples may be less than the channel filter having the largest number of taps, as noted herein.

The executable instructions stored in the CFR processing management module 1211 may facilitate, in conjunction with execution via the processing circuitry 1202, the device 1200 receiving and decoding processor instructions (which may be sent via the processing circuitry 1202 or other suitable component of the device 1200 or a component external to the device 1200), and providing arrays of data samples to the PEs within the programmable processing array portion 300 (such as via the various data interfaces as discussed herein). Additionally or alternatively, the executable instructions stored in the CFR processing management module 1211 may facilitate, in conjunction with execution via the processing circuitry 1202, the device 1200 performing the functions of the process flows 600, 650, as discussed herein. The functionality provided by the CFR processing management module 1211 is a function of the particular implementation and/or type of processing architecture implemented via the device 1200.

Thus, if a vector processor is implemented as the programmable processing array portion 300, then the CFR processing management module 1211 may facilitate the determination of each specific vector processor instruction to perform specific types of vector processing operations and/or any of the functionality with respect to a vector processor architecture such as the retrieval of vector data samples from vector registers, performing vector processing operations and/or computations, which may include the CFR operations as discussed herein, etc. Of course, in the event that the device 1200 implements an FPGA, DSP, or other suitable type of architecture as the programmable processing array portion 300, then the CFR processing management module 1211 may function to translate and/or decode instructions to identify the type of processing operations and/or calculations to perform on arrays of data samples in an analogous manner as the use of a vector processor.

The executable instructions stored in the data flow management module 1213 may facilitate, in conjunction with execution via the processing circuitry 1202, the routing of sets, blocks, and/or arrays of data samples within the transmit chain 500. This may include routing arrays of data samples to the programmable processing array portion 300, to the data interfaces 302.1, 302.2, routing the sets of data samples within the various blocks of the process flows 600, 650 to perform the various CFR operations, etc. Thus, the executable instructions stored in the data flow management module 1213 may facilitate routing data samples within any suitable type of processing and/or transmitter architecture to facilitate the execution of the CFR processing operations and the CFR algorithm as discussed herein.

General Operation of a Transmit Chain—Software Implementation

A non-transitory computer-readable medium is provided. The non-transitory computer-readable medium comprises instructions stored thereon that, when executed by processing circuitry, cause the processing circuitry to perform crest factor reduction (CFR) by: generating a scaled cancellation pulse signal comprising a first set of data samples; and performing CFR by subtracting the first set of data samples from a second set of data samples associated with a signal to be transmitted, to thereby generate a transmit signal, wherein the signal to be transmitted comprises a carrier signal that is filtered via a channel filter having a frequency response based upon a predetermined bandwidth of the carrier signal, and wherein the number of the first set of data samples is less than a number of taps of the channel filter. Furthermore, the instructions are executed via a programmable processing array to perform the CFR. In addition or in alternative to and in any combination with the optional features previously explained in this paragraph, the scaled cancellation pulse signal has a spectral response that is contained within a bandwidth of the carrier signal. In addition or in alternative to and in any combination with the optional features previously explained in this paragraph, the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps. In addition or in alternative to and in any combination with the optional features previously explained in this paragraph, the transmit signal complies with boundaries defined by a predetermined spectral mask. In addition or in alternative to and in any combination with the optional features previously explained in this paragraph, (i) a spectral response of the signal to be transmitted, and (ii) a spectral response of the cancellation pulse signal, are different from one another. In addition or in alternative to and in any combination with the optional features previously explained in this paragraph, the spectral response of the signal to be transmitted is identical to the spectral response of the scaled cancellation pulse signal except at spectral edges of the signal to be transmitted and the cancellation pulse signal.

General Operation of a Transmit Chain—Hardware Implementation

A system on a chip (SoC) is provided. The SoC comprises a channel filter configured to perform channel filtering on a carrier signal of a signal to be transmitted in accordance with a number of filter taps, the channel filter having a frequency response that is based upon a predetermined bandwidth of the carrier signal; and processing circuitry to perform crest factor reduction (CFR) by: generating a scaled cancellation pulse signal comprising a first set of data samples; and subtracting the first set of data samples from a second set of data samples associated with the signal to be transmitted, to thereby generate a transmit signal, wherein the number of the first set of data samples is less than the number of filter taps. Furthermore, the processing circuitry comprises part of an application specific integrated circuit (ASIC). In addition or in alternative to and in any combination with the optional features previously explained in this paragraph, the processing circuitry comprises part of a field programmable gate array (FPGA). In addition or in alternative to and in any combination with the optional features previously explained in this paragraph, the scaled cancellation pulse signal has a spectral response that is contained within a bandwidth of the carrier signal. In addition or in alternative to and in any combination with the optional features previously explained in this paragraph, the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps. In addition or in alternative to and in any combination with the optional features previously explained in this paragraph, the transmit signal complies with boundaries defined by a predetermined spectral mask. In addition or in alternative to and in any combination with the optional features previously explained in this paragraph, (i) a spectral response of the signal to be transmitted, and (ii) a spectral response of the cancellation pulse signal, are different from one another. In addition or in alternative to and in any combination with the optional features previously explained in this paragraph, the spectral response of the signal to be transmitted is identical to the spectral response of the scaled cancellation pulse signal except at spectral edges of the signal to be transmitted and the cancellation pulse signal.

A wireless device is provided. The wireless device comprises channel processing circuitry comprising a channel filter configured to perform channel filtering on a carrier signal of a signal to be transmitted in accordance with a number of filter taps, the channel filter having a frequency response that is based upon a predetermined bandwidth of the carrier signal; and transmitter circuitry configured to perform crest factor reduction (CFR) by: generating a scaled cancellation pulse signal comprising a first set of data samples; and subtracting the first set of data samples from a second set of data samples associated with the signal to be transmitted, to thereby generate a transmit signal, wherein the number of the first set of data samples is less than the number of filter taps. Furthermore, the scaled cancellation pulse signal has a spectral response that is contained within a bandwidth of the carrier signal. In addition or in alternative to and in any combination with the optional features previously explained in this paragraph, the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps. In addition or in alternative to and in any combination with the optional features previously explained in this paragraph, the transmit signal complies with boundaries defined by a predetermined spectral mask. In addition or in alternative to and in any combination with the optional features previously explained in this paragraph, (i) a spectral response of the signal to be transmitted, and (ii) a spectral response of the cancellation pulse signal, are different from one another. In addition or in alternative to and in any combination with the optional features previously explained in this paragraph, the spectral response of the signal to be transmitted is identical to the spectral response of the scaled cancellation pulse signal except at spectral edges of the signal to be transmitted and the cancellation pulse signal.

Process Flows

FIG. 13 illustrates a process flow. With reference to FIG. 13, the process flow 1300 may be executed by and/or otherwise associated with processing circuitry and/or storage devices. The processing circuitry and/or storage devices may be associated with one or more components of the transmit chain 500 as discussed herein and/or one or more components of the device 1200 as discussed herein. The processors and/or storage devices may be identified with one or more components of the transmit chain 500, such as the transmitter circuitry 502, processing circuitry identified with the PEs of the processing array 300, and/or the processing circuitry 1202. The flow 1300 may include alternate or additional steps that are not shown in FIG. 13 for purposes of brevity, and may be performed in a different order than the steps shown in FIG. 13.

Flow 1300 may begin when processing circuitry receive (block 1302) a set of data samples identified with a signal to be transmitted. This set of data samples may be up-sampled from an input signal x in accordance with an upsampling factor U, as discussed herein with respect to the process flows 600. 650 of FIGS. 6A and 6B.

Flow 1300 may include processing circuitry identifying (block 1304) a number of peak samples $N_p$ within the set of upsampled data samples.

Flow 1300 may include processing circuitry computing (block 1306) a scaling factor for each one of the $N_p$ peak samples. Again, each scaling factor is indicative of a magnitude by which each peak sample exceeds a predetermined threshold value, as noted above.

Flow 1300 may include processing circuitry performing (block 1308) a first peak cancellation process using the scaling factors of a number of peak samples $N_c$ that are a subset of the total number of peak samples $N_p$. This may include the identification of a set of clusters and peak sample clusters as noted herein. This may further include the computation of the gain factors z using the scaling factors of each of the cluster peak samples, which are used to generate a scaled set of truncated upsampled cancellation pulses. Each one of the scaled truncated upsampled cancellation pulses is then applied to the upsampled set of data samples in parallel, as noted above, to cancel each of the cluster peak samples.

Flow 1300 may include processing circuitry determining (block 1310) whether all peak samples have been cancelled. This may include computing the magnitude of each of the peak samples $N_p$ and determining if any of these peak samples still exceed the predetermined threshold value. If so, then the flow 1300 continues to the iterative gain computation process. Otherwise, the gain factors are set as the final gain factors for the generation of the cancellation pulse using the stored sets of cancellation pulses form the memory, as discussed above.

In the event that peaks still remain, the flow 1300 includes processing circuitry updating (block 1312) the previous scaling factor for each remaining peak sample, i.e. all peaks samples from the number of $N_p$ samples that were not cancelled via the parallel gain computation process.

Flow 1300 may include processing circuitry performing (block 1314) a second peak cancellation process using the largest remaining magnitude of the updated scaling factors. This may further include the computation of the gain factors z using this scaling factor, which is then used to generate a scaled truncated upsampled cancellation pulse. The scaled truncated upsampled cancellation pulse is then applied to the upsampled set of data samples, as noted above, to cancel the peak sample having the largest magnitude.

Flow 1300 may include processing circuitry determining (block 1316) whether the iterative gain computation conditions are met. This may include a determination of whether all peak samples have been cancelled and, if not, a further determination of whether a maximum number of iterations have been completed. This may include computing the magnitude of each of the peak samples $N_p$ and determining if any of these peak samples still exceed the predetermined threshold value. If so, then the flow 1300 continues to increment (block 1318) the iteration value and then repeat the process of updating (block 1312) the previous scaling factor, performing another (block 1314) sample peak cancellation process for the largest remaining peak sample, and determining (block 1316) whether the iterative gain computation conditions are now met.

Otherwise, i.e. once all peak samples are cancelled or a maximum number of iterations is met, the gain factors z are set (block 1320) as the final gain factors for the generation of the cancellation pulse using the stored sets of cancellation pulses form the memory, as discussed above.

Figure 14:
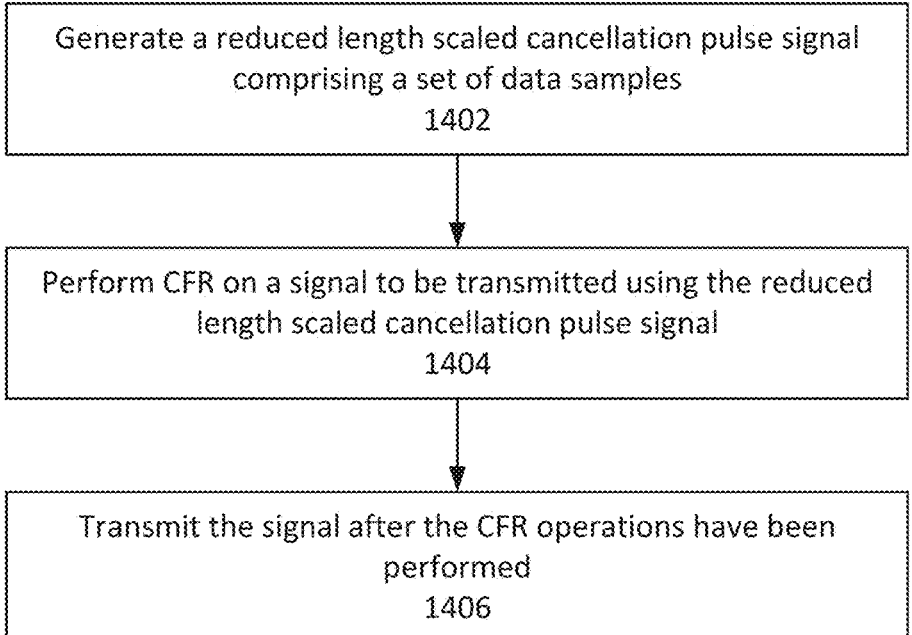
FIG. 14 illustrates a process flow, in accordance with the disclosure.

FIG. 14 illustrates a process flow. With reference to FIG. 14, the process flow 1400 may be executed by and/or otherwise associated with processing circuitry and/or storage devices. The processing circuitry and/or storage devices may be associated with one or more components of the transmit chain 500 as discussed herein and/or one or more components of the device 1200 as discussed herein. The processors and/or storage devices may be identified with one or more components of the transmit chain 500, such as the transmitter circuitry 502, processing circuitry identified with the PEs of the processing array 300, and/or the processing circuitry 1202. The flow 1400 may include alternate or additional steps that are not shown in FIG. 14 for purposes of brevity, and may be performed in a different order than the steps shown in FIG. 14.

Flow 1400 may begin when processing circuitry generate (block 1402) a reduced length cancellation pulse signal comprising a set of date samples. This reduced length cancellation pulse signal may comprise any suitable number of data samples that are less than the number of taps used by the channel filter having the largest number of taps.

Flow 1400 may include processing circuitry performing (block 1404) CFR operations on a signal to be transmitted using the reduced pulse cancellation pulse signal. This may include the CFR operations as discussed herein, which again may be performed via a processing array, FPGA, ASIC, etc. These CFR operations may comprise conventional CFR operations as discussed herein with reference to FIG. 4, or alternatively the CFR operations as discussed herein with reference to the process flows 600, 650.

Flow 1400 may include processing circuitry transmitting (block 1406) the transmit signal after the CFR operations have been performed. The transmitted signal may have a spectral response that complies with regulatory mask requirements, as discussed herein with respect to FIGS. 11A and 11B.

EXAMPLES

The following examples pertain to various techniques of the present disclosure.

An example (e.g. example 1) relates to a non-transitory computer-readable medium. The non-transitory computer-readable medium has instructions stored thereon that, when executed by processing circuitry, cause the processing circuitry to perform crest factor reduction (CFR) by: generating a scaled cancellation pulse signal comprising a first set of data samples; and performing CFR by subtracting the first set of data samples from a second set of data samples associated with a signal to be transmitted, to thereby generate a transmit signal, wherein the signal to be transmitted comprises a carrier signal that is filtered via a channel filter having a frequency response based upon a predetermined bandwidth of the carrier signal, and wherein the number of the first set of data samples is less than a number of taps of the channel filter.

Another example (e.g. example 2) relates to a previously-described example (e.g. example 1), wherein the instructions are executed via a programmable processing array to perform the CFR.

Another example (e.g. example 3) relates to a previously-described example (e.g. one or more of examples 1-2), wherein the scaled cancellation pulse signal has a spectral response that is contained within a bandwidth of the carrier signal.

Another example (e.g. example 4) relates to a previously-described example (e.g. one or more of examples 1-3), wherein: the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps.

Another example (e.g. example 5) relates to a previously-described example (e.g. one or more of examples 1-4), wherein the transmit signal complies with boundaries defined by a predetermined spectral mask.

Another example (e.g. example 6) relates to a previously-described example (e.g. one or more of examples 1-5), wherein (i) a spectral response of the signal to be transmitted, and (ii) a spectral response of the cancellation pulse signal, are different from one another.

Another example (e.g. example 7) relates to a previously-described example (e.g. one or more of examples 1-6), wherein the spectral response of the signal to be transmitted is identical to the spectral response of the scaled cancellation pulse signal except at spectral edges of the signal to be transmitted and the cancellation pulse signal.

An example (e.g. example 8) relates to a system on a chip (SoC), comprising: a channel filter configured to perform channel filtering on a carrier signal of a signal to be transmitted in accordance with a number of filter taps, the channel filter having a frequency response that is based upon a predetermined bandwidth of the carrier signal; and processing circuitry to perform crest factor reduction (CFR) by: generating a scaled cancellation pulse signal comprising a first set of data samples; and subtracting the first set of data samples from a second set of data samples associated with the signal to be transmitted, to thereby generate a transmit signal, wherein the number of the first set of data samples is less than the number of filter taps.

Another example (e.g. example 9) relates to a previously-described example (e.g. example 8), wherein the processing circuitry comprises part of an application specific integrated circuit (ASIC).

Another example (e.g. example 10) relates to a previously-described example (e.g. one or more of examples 8-9), wherein the processing circuitry comprises part of a field programmable gate array (FPGA).

Another example (e.g. example 11) relates to a previously-described example (e.g. one or more of examples 8-10), wherein the scaled cancellation pulse signal has a spectral response that is contained within a bandwidth of the carrier signal.

Another example (e.g. example 12) relates to a previously-described example (e.g. one or more of examples 8-11), wherein: the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps.

Another example (e.g. example 13) relates to a previously-described example (e.g. one or more of examples 8-12), wherein the transmit signal complies with boundaries defined by a predetermined spectral mask.

Another example (e.g. example 14) relates to a previously-described example (e.g. one or more of examples 8-13), wherein (i) a spectral response of the signal to be transmitted, and (ii) a spectral response of the cancellation pulse signal, are different from one another.

Another example (e.g. example 15) relates to a previously-described example (e.g. one or more of examples 8-14), wherein the spectral response of the signal to be transmitted is identical to the spectral response of the scaled cancellation pulse signal except at spectral edges of the signal to be transmitted and the cancellation pulse signal.

An example (e.g. example 16) relates to a wireless device, comprising: channel processing circuitry comprising a channel filter configured to perform channel filtering on a carrier signal of a signal to be transmitted in accordance with a number of filter taps, the channel filter having a frequency response that is based upon a predetermined bandwidth of the carrier signal; and transmitter circuitry configured to perform crest factor reduction (CFR) by: generating a scaled cancellation pulse signal comprising a first set of data samples; and subtracting the first set of data samples from a second set of data samples associated with the signal to be transmitted, to thereby generate a transmit signal, wherein the number of the first set of data samples is less than the number of filter taps.

Another example (e.g. example 17) relates to a previously-described example (e.g. example 16), wherein the scaled cancellation pulse signal has a spectral response that is contained within a bandwidth of the carrier signal.

Another example (e.g. example 18) relates to a previously-described example (e.g. one or more of examples 16-17), wherein: the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps.

Another example (e.g. example 19) relates to a previously-described example (e.g. one or more of examples 16-18), wherein the transmit signal complies with boundaries defined by a predetermined spectral mask.

Another example (e.g. example 20) relates to a previously-described example (e.g. one or more of examples 16-19), wherein (i) a spectral response of the signal to be transmitted, and (ii) a spectral response of the cancellation pulse signal, are different from one another.

Another example (e.g. example 21) relates to a previously-described example (e.g. one or more of examples 16-20), wherein the spectral response of the signal to be transmitted is identical to the spectral response of the scaled cancellation pulse signal except at spectral edges of the signal to be transmitted and the cancellation pulse signal.

An example (e.g. example 22) relates to a non-transitory computer-readable medium. The non-transitory computer-readable medium has instructions stored thereon that, when executed by processing means, cause the processing means to perform crest factor reduction (CFR) by: generating a scaled cancellation pulse signal comprising a first set of data samples; and performing CFR by subtracting the first set of data samples from a second set of data samples associated with a signal to be transmitted, to thereby generate a transmit signal, wherein the signal to be transmitted comprises a carrier signal that is filtered via a channel filter having a frequency response based upon a predetermined bandwidth of the carrier signal, and wherein the number of the first set of data samples is less than a number of taps of the channel filter.

Another example (e.g. example 23) relates to a previously-described example (e.g. example 22), wherein the instructions are executed via a programmable processing array to perform the CFR.

Another example (e.g. example 24) relates to a previously-described example (e.g. one or more of examples 22-23), wherein the scaled cancellation pulse signal has a spectral response that is contained within a bandwidth of the carrier signal.

Another example (e.g. example 25) relates to a previously-described example (e.g. one or more of examples 22-24), wherein: the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps.

Another example (e.g. example 26) relates to a previously-described example (e.g. one or more of examples 22-25), wherein the transmit signal complies with boundaries defined by a predetermined spectral mask.

Another example (e.g. example 27) relates to a previously-described example (e.g. one or more of examples 22-26), wherein (i) a spectral response of the signal to be transmitted, and (ii) a spectral response of the cancellation pulse signal, are different from one another.

Another example (e.g. example 28) relates to a previously-described example (e.g. one or more of examples 22-27), wherein the spectral response of the signal to be transmitted is identical to the spectral response of the scaled cancellation pulse signal except at spectral edges of the signal to be transmitted and the cancellation pulse signal.

An example (e.g. example 29) relates to a system on a chip (SoC), comprising: a channel filter means for performing channel filtering on a carrier signal of a signal to be transmitted in accordance with a number of filter taps, the channel filter means having a frequency response that is based upon a predetermined bandwidth of the carrier signal; and processing means for performing crest factor reduction (CFR) by: generating a scaled cancellation pulse signal comprising a first set of data samples; and subtracting the first set of data samples from a second set of data samples associated with the signal to be transmitted, to thereby generate a transmit signal, wherein the number of the first set of data samples is less than the number of filter taps.

Another example (e.g. example 30) relates to a previously-described example (e.g. example 29), wherein the processing means comprises part of an application specific integrated circuit (ASIC).

Another example (e.g. example 31) relates to a previously-described example (e.g. one or more of examples 29-30), wherein the processing means comprises part of a field programmable gate array (FPGA).

Another example (e.g. example 32) relates to a previously-described example (e.g. one or more of examples 29-31), wherein the scaled cancellation pulse signal has a spectral response that is contained within a bandwidth of the carrier signal.

Another example (e.g. example 33) relates to a previously-described example (e.g. one or more of examples 29-32), wherein: the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps.

Another example (e.g. example 34) relates to a previously-described example (e.g. one or more of examples 29-33), wherein the transmit signal complies with boundaries defined by a predetermined spectral mask.

Another example (e.g. example 35) relates to a previously-described example (e.g. one or more of examples 29-34), wherein (i) a spectral response of the signal to be transmitted, and (ii) a spectral response of the cancellation pulse signal, are different from one another.

Another example (e.g. example 36) relates to a previously-described example (e.g. one or more of examples 29-35), wherein the spectral response of the signal to be transmitted is identical to the spectral response of the scaled cancellation pulse signal except at spectral edges of the signal to be transmitted and the cancellation pulse signal.

An example (e.g. example 37) relates to a wireless device, comprising: channel processing means comprising a channel filter means for performing channel filtering on a carrier signal of a signal to be transmitted in accordance with a number of filter taps, the channel filter having a frequency response that is based upon a predetermined bandwidth of the carrier signal; and transmitter means for performing crest factor reduction (CFR) by: generating a scaled cancellation pulse signal comprising a first set of data samples; and subtracting the first set of data samples from a second set of data samples associated with the signal to be transmitted, to thereby generate a transmit signal, wherein the number of the first set of data samples is less than the number of filter taps.

Another example (e.g. example 38) relates to a previously-described example (e.g. example 37), wherein the scaled cancellation pulse signal has a spectral response that is contained within a bandwidth of the carrier signal.

Another example (e.g. example 39) relates to a previously-described example (e.g. one or more of examples 37-38), wherein: the signal to be transmitted is a composite signal comprising a plurality of carrier signals that include the carrier signal, each one of the plurality of carrier signals is filtered via a respective one of a plurality of channel filters, each having a respective number of taps, and the number of the first set of data samples is less than the number of taps of a respective one of the plurality of channel filters having the largest number of taps.

Another example (e.g. example 40) relates to a previously-described example (e.g. one or more of examples 37-39), wherein the transmit signal complies with boundaries defined by a predetermined spectral mask.

Another example (e.g. example 41) relates to a previously-described example (e.g. one or more of examples 37-40), wherein (i) a spectral response of the signal to be transmitted, and (ii) a spectral response of the cancellation pulse signal, are different from one another.

Another example (e.g. example 42) relates to a previously-described example (e.g. one or more of examples 37-41), wherein the spectral response of the signal to be transmitted is identical to the spectral response of the scaled cancellation pulse signal except at spectral edges of the signal to be transmitted and the cancellation pulse signal.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementation described herein are provided for illustrative purposes, and are not limiting. Other implementation are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A non-transitory computer-readable medium configured to store instructions that, when executed by processing circuitry, cause the processing circuitry to perform crest factor reduction (CFR) by:

generating a scaled cancellation pulse signal comprising a first set of data samples; and performing CFR by subtracting the first set of data samples from a second set of data samples associated with a CFR input signal, to thereby generate a transmit signal, wherein the CFR input signal comprises a carrier signal that is filtered via a channel filter having a frequency response based upon a predetermined bandwidth of the carrier signal, wherein the scaled cancellation pulse signal is (i) separate from the CER input signal, and (ii) generated using simulated channel filter parameters that differ from filter parameters used by the channel filter to filter the carrier signal, and wherein a number of the first set of data samples is less than a number of taps of the channel filter.

2. The non-transitory computer-readable medium of claim 1, wherein the instructions are executed via a programmable processing array to perform the CFR on the CER input signal to generate the transmit signal.

3. The non-transitory computer-readable medium of claim 1, wherein the scaled cancellation pulse signal has a spectral response that is contained within a bandwidth of the carrier signal.

4. The non-transitory computer-readable medium of claim 1, wherein:

the CFR input signal comprises a composite signal comprising a plurality of carrier signals that include the carrier signal, the plurality of carrier signals are filtered via a respective one of a plurality of channel filters, each one of the plurality of channel filters having a respective number of taps, and the number of the first set of data samples is less than the number of taps of a respective one of the plurality of channel filters having the largest number of taps.

5. The non-transitory computer-readable medium of claim 1, wherein the transmit signal complies with boundaries defined by a predetermined spectral mask.

6. The non-transitory computer-readable medium of claim 1, wherein (i) a spectral response of the CFR input signal, and (ii) a spectral response of the scaled cancellation pulse signal, are different from one another.

7. The non-transitory computer-readable medium of claim 1, wherein a spectral response of the CFR input signal is identical to a spectral response of the scaled cancellation pulse signal except at spectral edges of the CFR input signal and the scaled cancellation pulse signal.

8. A system on a chip (SoC), comprising:

a channel filter configured to perform channel filtering on a carrier signal of a CER input signal in accordance with a number of filter taps, the channel filter having a frequency response that is based upon a predetermined bandwidth of the carrier signal; and processing circuitry configured to perform crest factor reduction (CFR) on the CFR input signal by:

generating a scaled cancellation pulse signal comprising a first set of data samples; and subtracting the first set of data samples from a second set of data samples associated with the CFR input signal, to thereby generate a transmit signal, wherein the scaled cancellation pulse signal is (1) separate from the CFR input signal, and (ii) generated using simulated channel filter parameters that differ from filter parameters used by the channel filter to filter the carrier signal, and wherein the number of the first set of data samples is less than the number of filter taps.

9. The SoC of claim 8, wherein the processing circuitry comprises part of an application specific integrated circuit (ASIC).

10. The SoC of claim 8, wherein the processing circuitry comprises part of a field programmable gate array (FPGA).

11. The SoC of claim 8, wherein the scaled cancellation pulse signal has a spectral response that is contained within a bandwidth of the carrier signal.

12. The SoC of claim 8, wherein:

the CFR input signal comprises a composite signal comprising a plurality of carrier signals that include the carrier signal, the plurality of carrier signals are filtered via a respective one of a plurality of channel filters, each one of the plurality of channel filters having a respective number of taps, and the number of the first set of data samples is less than the number of taps of a respective one of the plurality of channel filters having the largest number of taps.

13. The SoC of claim 8, wherein the transmit signal complies with boundaries defined by a predetermined spectral mask.

14. The SoC of claim 8, wherein (i) a spectral response of the CFR input signal, and (ii) a spectral response of the scaled cancellation pulse signal, are different from one another.

15. The SoC of claim 8, wherein a spectral response of the CFR input signal is identical to a spectral response of the scaled cancellation pulse signal except at spectral edges of the CFR input signal and the scaled cancellation pulse signal.

16. A wireless device, comprising:

channel processing circuitry comprising a channel filter configured to perform channel filtering on a carrier signal of a CER input signal in accordance with a number of filter taps, the channel filter having a frequency response that is based upon a predetermined bandwidth of the carrier signal; and transmitter circuitry configured to perform crest factor reduction (CFR) on the CFR input signal by:

generating a scaled cancellation pulse signal comprising a first set of data samples; and subtracting the first set of data samples from a second set of data samples associated with the CFR input signal, to thereby generate a transmit signal, wherein the scaled cancellation pulse signal is (i) separate from the CER input signal, and (ii) generated using simulated channel filter parameters that differ from filter parameters used by the channel filter to filter the carrier signal, and wherein the number of the first set of data samples is less than the number of filter taps.

17. The wireless device of claim 16, wherein the scaled cancellation pulse signal has a spectral response that is contained within a bandwidth of the carrier signal.

18. The wireless device of claim 16, wherein:

the CER input signal comprises a composite signal comprising a plurality of carrier signals that include the carrier signal, the plurality of carrier signals are filtered via a respective one of a plurality of channel filters, each one of the plurality of channel filters having a respective number of taps, and the number of the first set of data samples is less than the number of taps of a respective one of the plurality of channel filters having the largest number of taps.

19. The wireless device of claim 16, wherein the transmit signal complies with boundaries defined by a predetermined spectral mask.

20. The wireless device of claim 16, wherein (i) a spectral response of the CER input signal, and (ii) a spectral response of the scaled cancellation pulse signal, are different from one another.

21. The wireless device of claim 16, wherein a spectral response of the CFR input signal is identical to a spectral response of the scaled cancellation pulse signal except at spectral edges of the CER input signal and the scaled cancellation pulse signal.

* * * * *